United States Patent
Melodia et al.

(10) Patent No.: US 12,120,096 B2
(45) Date of Patent: Oct. 15, 2024

(54) PRIVATE 5G CELLULAR CONNECTIVITY AS A SERVICE THROUGH FULL-STACK WIRELESS STEGANOGRAPHY

(71) Applicant: Northeastern University, Boston, MA (US)

(72) Inventors: Tommaso Melodia, Newton, MA (US); Leonardo Bonati, Boston, MA (US); Salvatore D'Oro, Allston, MA (US); Francesco Restuccia, Boston, MA (US)

(73) Assignee: Northeastern University, Boston, MA (US)

( * ) Notice: Subject to any disclaimer, the term of this patent is extended or adjusted under 35 U.S.C. 154(b) by 693 days.

(21) Appl. No.: 17/316,773

(22) Filed: May 11, 2021

(65) Prior Publication Data

US 2021/0352053 A1   Nov. 11, 2021

Related U.S. Application Data

(60) Provisional application No. 63/022,648, filed on May 11, 2020.

(51) Int. Cl.
*H04L 67/02* (2022.01)
*H04L 5/00* (2006.01)
*H04L 9/40* (2022.01)

(52) U.S. Cl.
CPC ........ *H04L 63/0428* (2013.01); *H04L 5/0048* (2013.01); *H04L 5/0055* (2013.01); *H04L 63/1475* (2013.01)

(58) Field of Classification Search
CPC ........ H04M 3/38; H04M 1/66; H04M 1/0202; H04M 1/0274; H04M 1/6058;
(Continued)

(56) References Cited

U.S. PATENT DOCUMENTS 10,318,470 B1 *   6/2019  Kugel ................ H03M 7/30
11,108,429 B1 *   8/2021  Crouch .............. H04L 63/1475
(Continued)

OTHER PUBLICATIONS

Kumar et al., "PHY-layer Authentication Using Hierarchical Modulation and Duobinary Signaling." 2014, In Proc. of IEEE Intl. Conf. on Computing, Net-working and Communications (ICNC). Honolulu, HI, USA, 5 pages.
(Continued)

*Primary Examiner* — Eva Y Puente
(74) *Attorney, Agent, or Firm* — Verrill Dana, LLP

(57) ABSTRACT

A steganographic communication system and method are provided. A covert packet generator can embed a stream of covert data as covert data symbols within primary I/Q symbols of a primary data stream in a covert packet. The covert packet has a data structure having a header, a payload, and a payload error detecting code. The header includes information on how to demodulate the covert packet by a receiver. The covert packet generator can also determine if a number of primary I/Q symbols is large enough to generate the header and can generate displacements in the primary I/Q symbols in a constellation diagram randomly in a plurality of transmissions to mimic channel noise. A transmitter and receiver can provide mutual authentication for covert transmissions.

18 Claims, 22 Drawing Sheets

(58) Field of Classification Search
CPC ............. H04M 1/72409; H04M 15/68; H04M 17/202; H04M 17/35; H04L 63/0428; H04L 9/0662; H04L 9/3231; H04L 1/0061; H04L 63/0861; H04L 63/1408; H04L 69/16; H04L 69/163; H04L 1/0079; H04L 1/1664; H04L 1/1854; H04L 27/02; H04L 67/02; H04L 5/0048; H04L 5/0055; H04L 63/1475; H04L 67/61; H04L 27/0008; H04L 27/0012; H04W 12/06; H04W 12/126; H04W 84/042; H04W 88/02; H04W 12/65; H04W 12/02; H04W 12/033; H04W 12/106
USPC .......................................................... 375/260
See application file for complete search history.

(56) References Cited

U.S. PATENT DOCUMENTS

| | | | | |
|---|---|---|---|---|
| 2005/0128936 | A1* | 6/2005 | Shao | H04L 1/0643 375/267 |
| 2009/0129378 | A1* | 5/2009 | Pagan | H04L 67/61 370/389 |
| 2023/0412616 | A1* | 12/2023 | Goldstein | H04L 63/1416 |

OTHER PUBLICATIONS

Marquez et al., "Resource Sharing Efficiency in Network Slicing." IEEE Transactions on Network and Service Management 16, (Sep. 3, 2019), pp. 909-923.

Nain et al., "A Reliable Covert Channel Over IEEE 802.15.4 Using Steganography." In Proc. of IEEE World Forum on Internet of Things (WF-IoT). Reston, VA, USA. 6 pages, 2016.

D'Oro et al., "Hiding Data in Plain Sight: Undetectable Wireless Communications Through Pseudo-Noise Asymmetric Shift Keying." In Proc. of IEEE Conf. on Computer Communications (INFOCOM). Paris, France. 2019, 9 pages.

Sankhe et al., "Impairment Shift Keying: Covert Signaling by Deep Learning of Controlled Radio Imperfections." In Proc. of IEEE Military Communications Conference (MILCOM). Norfolk, VA, USA, 2019, 6 pages.

Afolabi et al., "Network Slicing and Softwarization: A Survey on Principles, Enabling Technologies, and Solutions." IEEE Communications Surveys & Tutorials 20, (Mar. 3, 2018), 25 pages.

Bash et al., "Hiding Information in Noise: Fundamental Limits of Covert Wireless Communication." IEEE Communications Magazine 53, (Dec. 12, 2015), 6 pages.

Cao et al., "A Wireless Covert Channel Based on Constellation Shaping Modulation." Hindawi Security and Communication Networks 2018 (Jan. 2018), 16 pages.

Classen et al., "Practical Covert Channels for WiFi Systems." In Proc. of IEEE Conf. on Commu-nications and Network Security (CNS). Florence, Italy, 2015, 9 pages.

Dutta et al., "Secret Agent Radio: Covert Communication through Dirty Constellations." In Proc. of Springer Intl. Workshop on Information Hiding. Berkeley, CA, USA, 2012, 16 pages.

Foukas et al., "Network Slicing in 5G: Survey and Challenges." IEEE Communications Magazine 55, (May 5, 2017), 8 pages.

Grabski et al., "Steganography in OFDM Symbols of Fast IEEE 802.11n Networks." In Proc. of IEEE Security and Privacy Workshops. San Francisco, CA, USA. 2013, pp. 158-164.

Hamdaqa et al., "ReLACK: A Reliable VoIP Steganography Approach." In Proc. of IEEE Intl. Conf. on Secure Software Integration and Reliability Improvement. Jeju Island, South Korea, 2011, 10 pages.

Hijaz et al., "Exploiting OFDM Systems for Covert Communication." In Proc. of IEEE Military Communications Conf. (MILCOM). San Jose, CA, USA, 2010, pp. 663-669.

Szczypiorski et al., "Hiding Data in OFDM Symbols of IEEE 802.11 Networks." In Proc. of IEEE Intl. Conf. on Multimedia Information Networking and Security (MINES). Nanjing, Jiangsu, China, 2010, 7 pages.

Zielinska et al., "Direct Sequence Spread Spectrum Steganographic Scheme for IEEE 802.15.4." In Proc of IEEE Intl. Conf. on Multimedia Information Networking and Security (MINES). Shanghai, China, 2011, 6 pages.

\* cited by examiner (a) Flag = 01.   (b) Flag = 11.   (c) Thresholds.

PRIVATE 5G CELLULAR CONNECTIVITY AS A SERVICE THROUGH FULL-STACK WIRELESS STEGANOGRAPHY

CROSS REFERENCE TO RELATED APPLICATIONS

This application claims benefit under 35 U.S.C. § 119(e) of U.S. Provisional Application No. 63/022,648, filed on 11 May 2020, entitled "Private 5G Cellular Connectivity as a Service Through Full-Stack Wireless Steganography," the disclosure of which is hereby incorporated by reference.

STATEMENT REGARDING FEDERALLY SPONSORED RESEARCH OR DEVELOPMENT

This invention was made with government support under Grant Number 1618727 awarded by the National Science Foundation. The government has certain rights in the invention.

BACKGROUND

Softwarization of radio access network (RAN) resources is an important component of fifth-generation (5G) cellular networks. By leveraging virtualization technologies, infrastructure providers (IPs) can create virtual networks built on top of the physical infrastructure. This innovation can concretely realize the long-standing vision of cellular connectivity as a service (CCaaS), where the IP decides the physical resources (e.g., spectrum, power, base stations, etc.) to provide to each mobile virtual network operator (MVNO) according to their necessities. CCaaS is envisioned to provide improved levels of quality of experience (QoE) to mobile users, as well as usher in new business opportunities between IPs and MVNOs. CCaaS can be effective in optimizing networking resources utilization with respect to traditional technologies.

SUMMARY

Fifth-generation (5G) communication systems are being developed to extensively employ radio access network (RAN) softwarization. This innovation will ultimately allow the instantiation of "virtual cellular networks" running on shared physical infrastructure. With the technology described herein, RAN softwarization is provided that includes a concept of private cellular connectivity as a Service (PCCaaS), where infrastructure providers deploy covert network slices whose existence is known only to a subset of receivers. To concretely realize PCCaaS, the technology herein provides a steganographic system (sometimes termed "SteaLTE" herein), which can be a PCCaaS-enabling system for cellular networks. The stenographic system utilizes wireless steganography to disguise data as noise to adversarial receivers. The system takes a full-stack approach to wireless steganography, which enables several technical aspects, including: (i) An LTE-compliant steganographic protocol stack for PCCaaS-based communications, and (ii) packet schedulers and procedures to properly embed covert data streams on top of traditional cellular traffic, i.e., primary traffic. The steganographic system can balance undetectability and performance by providing a mechanism that mimics channel impairments so that received waveforms are almost indistinguishable from noise. The performance of the steganographic system was evaluated on an LTE-compliant testbed under different traffic profiles, distance and mobility patterns. Experiments were performed on the PAWR POWDER platform with long-range cellular links, where base station and user equipment were 852 ft apart. Results indicate that the steganographic system reduced the distance from a distribution without covert data by 4.8× compared to the state of the art. It also delivered covert throughput within 90% of the primary throughput without degrading it more than 6%.

Additional embodiments, aspects, and features include the following:

1. A device for steganographic communication comprising:
    a transmitter including one or more processors and memory, instructions stored in the memory, the transmitter comprising a covert packet generator operative to receive a covert data stream of covert data and a primary data stream of primary in-phase and quadrature (I/Q) symbols, and to embed the covert data as covert data symbols within the primary I/Q symbols in a covert packet, wherein the covert packet has a data structure comprising a header, a payload, and a payload error detecting code; and
    a radio frequency (RF) front end and antenna operative to transmit and receive radio frequency signals, the RF front end in communication with the covert packet generator to receive the covert packet for transmission.
2. The device of 1, wherein the header includes:
    a payload length field containing a total length of the covert payload and the payload error detecting code;
    an information field containing information on how to demodulate the covert packet by a receiver; and
    a header error detecting code field.
3. The device of any of 1-2, wherein the information field contains a packet number comprising a sequential number to identify the covert packet.
4. The device of any of 1-3, wherein the information field includes a covert modulation scheme identification.
5. The device of any of 1-4, wherein the information field includes covert modulation parameters, the cover modulation parameters including a modulation order, coding map associating covert bit sequences to modulated covert symbols, and a packet type.
6. The device of any of 1-5, wherein the modulation parameters are indicative of an amplitude shift keying modulation scheme, phase shift keying modulation scheme, frequency shift keying modulation scheme, or quadrature amplitude modulation scheme.
7. The device of any of 1-6, wherein the information field includes a modulation scheme identification including modulation schemes such as amplitude shift keying modulation scheme, phase shift keying modulation scheme, frequency shift keying modulation scheme, or quadrature amplitude modulation scheme.
8. The device of any of 1-7, wherein the information field contains a threshold flag indicative of a distance between the covert data symbols on a constellation diagram.
9. The device of any of 1-8, wherein the information field contains an identification of a packet type, wherein the packet type is one or more of an acknowledgement (ACK) message type, a negative-acknowledgement (NACK) message type, a covert data-carrying type, a packet information-carrying type, a challenge message type, a challenge response message type, and an authentication acknowledgement message type.
10. The device of any of 1-9, wherein the packet information-carrying type includes information on source and destination of covert packets and a total number of covert packets in a transmission.

11. The device of any of 1-10, wherein the header error detecting code field contains a cyclic redundancy check code.
12. The device of any of 1-12, wherein the payload error detecting code comprises a cyclic redundancy check code.
13. The device of any of 1-12, wherein the covert packet generator is operative to determine if a number of the primary I/Q symbols is large enough to generate the header of the covert packet.
14. The device of any of 1-13, wherein the covert packet generator is operative to generate displacements in the primary I/Q symbols in a constellation diagram based on the covert data symbols.
15. The device of any of 1-14, wherein the covert packet generator is operative to generate the displacements randomly among a plurality of transmitted covert packets in a transmission stream.
16. The device of any of 1-15, wherein the covert packet generator is operative to include a threshold flag in the header of the covert packet comprising a value indicative of the displacement in the I/Q symbols, and wherein the value is changed on a per-packet basis.
17. The device of any of 1-16, wherein the covert packet generator is operative to generate covert packet transmissions that mimic wireless channel noise.
18. The device of any of 1-17, wherein the transmitter is further operative to transmit a queue of covert packets to a receiver, located remotely from the transmitter, and to wait a determined time for an acknowledgement message or a negative-acknowledgement message from the receiver.
19. The device of any of 1-18, wherein the acknowledgement message and the negative-acknowledgement message are transmitted as covert packets by the receiver.
20. The device of any of 1-19, wherein the negative-acknowledgement message contains an identification of a data packet that was unsuccessfully decoded or was not received at the receiver.
21. The device of any of 1-20, wherein the transmitter is further operative to retransmit the queue of covert packets to the receiver upon receipt of a negative-acknowledgement message.
22. The device of any of 1-21, wherein the transmitter is further operative to retransmit the queue of covert packets to the receiver upon expiration of the determined time if no acknowledgement message or negative-acknowledgement message has been received at the transmitter.
23. The device of any of 1-22, wherein the transmitter is further operative to stop attempted transmissions of the queue of covert packets after a number of retransmission attempts exceeds a determined threshold.
24. A system for steganographic communication, comprising:
the device of any of 1-23; and
a receiver located remotely from the transmitter, the transmitter and the receiver operative to mutually authenticate covert messages sent between the transmitter and the receiver.
25. The system of 24, wherein the transmitter and the receiver are operative to send covert authentication messages, the covert authentication messages including a type indicator including a challenge type, a challenge response, and an authentication acknowledgement type.
26. The system of any of 24-25, wherein the transmitter is operative to authenticate the receiver by:
sending a covert authentication message to the receiver including an authentication code;
receiving a reply covert message from the receiver including an authentication code result;
determining if the authentication code result from the receiver matches an expected authentication code result; and
if the authentication code result matches the expected authentication code result, sending a covert authentication acknowledgement message to the receiver.
27. The system of any of 24-26, wherein the receiver is operative to authenticate the transmitter by:
sending a further covert authentication message to the transmitter including a further authentication code;
receiving a further reply covert message from the transmitter including a further authentication code result;
determining if the further authentication code result from the transmitter matches a further expected authentication code result; and
if the further authentication code result matches the further expected authentication code result, sending a further covert authentication acknowledgement message to the transmitter.
28. The system of any of 24-27, wherein the transmitter is further operative to:
schedule a plurality of primary transmissions each comprising a data stream of primary I/Q symbols;
generate and embed a covert packet on a selected one of the primary transmissions;
map the primary transmissions onto a cellular resource grid; and
transmit the primary transmissions.
29. The system of any of 24-28, wherein the receiver is located remotely from the transmitter and includes one or more processors and memory, instructions stored in the memory, the receiver comprising:
a covert packet detector operative to receive incoming transmissions from the transmitter, to detect a presence of the covert packet, and to extract covert information from the covert packet; and
a covert demodulator operative to demodulate the covert symbols.
30. The system of any of 24-29, wherein the covert packet detector is operative to detect a header error code indicative of the incoming covert packet in the header of the covert packet.
31. The system of any of 24-30, wherein the covert packet detector is operative to read a length of a covert payload and a payload error code, a packet number, and modulation parameters in the header.
32. The system of any of 224-31, wherein the covert demodulator is operative to demodulate the covert symbols based on the modulation parameters in the header.
33. The system of any of 24-32, wherein the receiver includes a further covert packet generator to receive a further covert data stream of covert data and a further primary data stream of primary I/Q symbols, and to embed the further covert data as covert data symbols within the primary I/Q symbols in a covert packet for transmission to the transmitter.
34. A device for a steganographic communication system comprising:
a transmitter including one or more processors and memory, instructions stored in the memory, the transmitter comprising:
a covert packet generator operative to receive a covert data stream of covert data and a primary data stream of primary in-phase and quadrature (I/Q) symbols, and to embed the covert data as covert data symbols within the primary I/Q symbols in a covert packet, wherein the covert packet has a data structure comprising a header, a payload, and a payload error detecting code; and a radio frequency (RF) front end and antenna operative to transmit and receive radio frequency signals, the RF front end in communication with the covert packet generator to receive the covert packet for transmission.

35. The device of 34, wherein the header includes:
a payload length field containing a total length of the covert payload and the payload error detecting code;
an information field containing information on how to demodulate the covert packet by a receiver; and
a header error detecting code field.

36. The device of any of 34-35, wherein the information field contains a packet number comprising a sequential number to identify the covert packet.

37. The device of any of 34-36, wherein the information field includes a covert modulation scheme identification.

38. The device of any of 34-37, wherein the information field includes covert modulation parameters, the cover modulation parameters including a modulation order, coding map associating covert bit sequences to modulated covert symbols, and a packet type.

39. The device of any of 34-38, wherein the modulation parameters are indicative of an amplitude shift keying modulation scheme, phase shift keying modulation scheme, frequency shift keying modulation scheme, or quadrature amplitude modulation scheme.

40. The device of any of 34-39, wherein the information field includes a modulation scheme identification including modulation schemes such as amplitude shift keying modulation scheme, phase shift keying modulation scheme, frequency shift keying modulation scheme, or quadrature amplitude modulation scheme.

41. The device of any of 34-40, wherein the information field contains a threshold flag indicative of a distance between the covert data symbols on a constellation diagram.

42. The device of any of 34-41, wherein the information field contains an identification of a packet type, wherein the packet type is one or more of an acknowledgement (ACK) message type, a negative-acknowledgement (NACK) message type, a covert data-carrying type, a packet information-carrying type, a challenge message type, a challenge response message type, and an authentication acknowledgement message type.

43. The device of any of 34-42, wherein the packet information-carrying type includes information on source and destination of covert packets and a total number of covert packets in a transmission.

44. The device of any of 34-43, wherein the header error detecting code field contains a cyclic redundancy check code.

45. The device of any of 34-44, wherein the payload error detecting code comprises a cyclic redundancy check code.

46. The device of any of 34-45, wherein the covert packet generator is operative to determine if a number of the primary I/Q symbols is large enough to generate the header of the covert packet.

47. The device of any of 34-46, wherein the covert packet generator is operative to generate displacements in the primary I/Q symbols in a constellation diagram based on the covert data symbols.

48. The device of any of 34-47, wherein the covert packet generator is operative to generate the displacements randomly among a plurality of transmitted covert packets in a transmission stream.

49. The device of any of 34-48, wherein the covert packet generator is operative to include a threshold flag in the header of the covert packet comprising a value indicative of the displacement in the I/Q symbols, and wherein the value is changed on a per-packet basis.

50. The device of any of 34-49, wherein the covert packet generator is operative to generate covert packet transmissions that mimic wireless channel noise.

51. The device of any of 34-50, wherein the transmitter is further operative to transmit a queue of covert packets to a receiver, located remotely from the transmitter, and to wait a determined time for an acknowledgement message or a negative-acknowledgement message from the receiver.

52. The device of any of 34-51, wherein the acknowledgement message and the negative-acknowledgement message are covert packets transmitted by the receiver.

53. The device of any of 34-52, wherein the negative-acknowledgement message contains an identification of a data packet that was unsuccessfully decoded or was not received at the receiver.

54. The device of any of 34-53, wherein the transmitter is further operative to retransmit the queue of covert packets to the receiver upon receipt of a negative-acknowledgement message.

55. The device of any of 34-54, wherein the transmitter is further operative to retransmit the queue of covert packets to the receiver upon expiration of the determined time if no acknowledgement message or negative-acknowledgement message has been received at the transmitter.

56. The device of any of 34-55, wherein the transmitter is further operative to stop attempted transmissions of the queue of covert packets after a number of retransmission attempts exceeds a determined threshold.

57. The device of any of 34-56, wherein the transmitter is further operative to:
schedule a plurality of primary transmissions each comprising a data stream of primary I/Q symbols;
generate and embed a covert packet on a selected one of the primary transmissions;
map the primary transmissions onto a cellular resource grid; and
transmit the primary transmissions.

58. A device for a steganographic communication system comprising:
a receiver located remotely from a steganographic transmitter, the receiver and the steganographic transmitter operative to mutually authenticate covert messages sent between the transmitter and the receiver;
the receiver including one or more processors and memory, instructions stored in the memory, the receiver comprising:
a covert packet generator operative to receive a covert data stream of covert data and a primary data stream of primary in-phase and quadrature (I/Q) symbols, and to embed the covert data as covert data symbols within the primary I/Q symbols in a covert packet, wherein the covert packet has a data structure comprising a header, a payload, and a payload error detecting code; and
a radio frequency (RF) front end and antenna operative to transmit and receive radio frequency signals, the RF front end in communication with the covert packet generator to receive the covert packet for transmission.

59. The device of 58, wherein the receiver comprises:

a covert packet detector operative to receive incoming transmissions from the transmitter, to detect a presence of the covert packet, and to extract covert information from the covert packet; and a covert demodulator operative to demodulate the covert symbols.

60. The device of any of 58-59, wherein the covert packet detector is operative to detect a header error code indicative of the incoming covert packet in the header of the covert packet.

61. The device of any of 58-60, wherein the covert packet detector is operative to read a length of a covert payload and a payload error code, a packet number, and modulation parameters in the header.

62. The device of any of 58-61, wherein the covert demodulator is operative to demodulate the covert symbols based on the modulation parameters in the header.

63. The device of any of 58-62, wherein the receiver includes a further covert packet generator to receive a further covert data stream of covert data and a further primary data stream of primary I/Q symbols, and to embed the further covert data as covert data symbols within the primary I/Q symbols in a covert packet for transmission to the transmitter.

64. The device system of any of 58-63, wherein the transmitter and the receiver are operative to send covert authentication messages, the covert authentication messages including a type indicator including a challenge type, a challenge response, and an authentication acknowledgement type.

65. The device of any of 58-64, wherein the receiver is operative to authenticate the transmitter by:

sending a further covert authentication message to the transmitter including a further authentication code;

receiving a further reply covert message from the transmitter including a further authentication code result;

determining if the further authentication code result from the transmitter matches a further expected authentication code result; and if the further authentication code result matches the further expected authentication code result, sending a further covert authentication acknowledgement message to the transmitter.

66. A method of steganographic communication comprising:

providing the device for of steganographic communication of any of 1-23, the system of any of 23-33, the device of any of 34-57, and/or the device of any of 58-65;

generating a covert packet containing covert data embedded as covert symbols within primary in-phase and quadrature (I/Q) symbols, the covert packet having a data structure comprising a header, a payload, and a payload error detecting code; and transmitting the covert packet as a radio frequency (RF) transmission.

67. The method of 66, further comprising generating the header to include:

a payload length field containing a total length of the covert payload and the payload error detecting code;

an information field containing information on how to demodulate the covert packet by a receiver; and a header error detecting code field.

68. The method of any of 66-67, wherein the information field contains a packet number comprising a sequential number to identify the covert packet.

69. The method of any of 66-68, wherein the information field includes a covert modulation scheme identification.

70. The method of any of 66-69, wherein the information field includes covert modulation parameters, the cover modulation parameters including a modulation order, coding map associating covert bit sequences to modulated covert symbols, and a packet type.

71. The method of any of 66-70, wherein the modulation parameters are indicative of an amplitude shift keying modulation scheme, phase shift keying modulation scheme, frequency shift keying modulation scheme, or quadrature amplitude modulation scheme.

72. The method of any of 66-71, wherein the information field includes a modulation scheme identification including modulation schemes such as amplitude shift keying modulation scheme, phase shift keying modulation scheme, frequency shift keying modulation scheme, or quadrature amplitude modulation scheme.

73. The method of any of 66-72, wherein the information field contains a threshold flag indicative of a distance between the covert data symbols on a constellation diagram.

74. The method of any of 66-73, wherein the information field contains an identification of a packet type, wherein the packet type is one or more of an acknowledgement (ACK) message type, a negative-acknowledgement (NACK) message type, a covert data-carrying type, a packet information-carrying type, a challenge message type, a challenge response message type, and an authentication acknowledgement message type.

75. The method of any of 66-74, wherein the packet information-carrying type includes information on source and destination of covert packets and a total number of covert packets in a transmission.

76. The method of any of 66-75, wherein the header error detecting code field contains a cyclic redundancy check code.

77. The method of any of 66-76, wherein the payload error detecting code comprises a cyclic redundancy check code.

78. The method of any of 66-77, further comprising determining if a number of the primary I/Q symbols is large enough to generate the header of the covert packet.

79. The method of any of 66-78, further comprising generating displacements in the primary I/Q symbols in a constellation diagram based on the covert data symbols.

80. The method of any of 66-79, further comprising generating the displacements randomly among a plurality of transmitted covert packets in a transmission stream.

81. The method of any of 66-80, further comprising generating a threshold flag in the header of the covert packet comprising a value indicative of the displacement in the I/Q symbols, and changing the value on a per-packet basis.

82. The method of any of 66-81, further comprising generating covert packet transmissions that mimic wireless channel noise.

83. The method of any of 66-82, further comprising, at a transmitter, transmitting a queue of covert packets to a receiver, located remotely from the transmitter, and waiting a determined time for an acknowledgement message or a negative-acknowledgement message from the receiver.

84. The method of any of 66-83, further comprising transmitting the acknowledgement message and the negative-acknowledgement message as covert packets by the receiver.

85. The method of any of 66-84, wherein the negative-acknowledgement message contains an identification of a data packet that was unsuccessfully decoded or was not received at the receiver.

86. The method of any of 66-85, further comprising, at the transmitter, retransmitting the queue of covert packets to the receiver upon receipt of a negative-acknowledgement message.
87. The method of any of 66-86, further comprising, at the transmitter, retransmitting the queue of covert packets to the receiver upon expiration of the determined time if no acknowledgement message or negative-acknowledgement message has been received at the transmitter.
88. The method of any of 66-87, further comprising, at the transmitter, stopping attempted transmissions of the queue of covert packets after a number of retransmission attempts exceeds a determined threshold.
89. The method of any of 66-88, further comprising mutually authenticating covert messages sent between a transmitter and a receiver located remotely from the transmitter.
90. The method of any of 66-89, further comprising, at the transmitter and/or the receiver, sending covert authentication messages, the covert authentication messages including a type indicator including a challenge type, a challenge response type, and an authentication acknowledgement type.
91. The method of any of 66-90, further comprising, at the transmitter, authenticating the receiver by:
sending a covert authentication message to the receiver including an authentication code;
receiving a reply covert message from the receiver including an authentication code result;
determining if the authentication code result from the receiver matches an expected authentication code result; and
if the authentication code result matches the expected authentication code result, sending a covert authentication acknowledgement message to the receiver.
92. The method of any of 66-91, further comprising, at the receiver, authenticating the transmitter by:
sending a further covert authentication message to the transmitter including a further authentication code;
receiving a further reply covert message from the transmitter including a further authentication code result;
determining if the further authentication code result from the transmitter matches a further expected authentication code result; and
if the further authentication code result matches the further expected authentication code result, sending a further covert authentication acknowledgement message to the transmitter.
93. The method of any of 66-92, further comprising:
scheduling a plurality of primary transmissions each comprising a data stream of primary I/Q symbols;
generating and embedding a covert packet on a selected one of the primary transmissions; and
mapping the primary transmissions onto a cellular resource grid for transmission.
94. The method of any of 66-93, further comprising, at a receiver located remotely from a transmitter:
receiving incoming transmissions from the transmitter;
detecting a presence of the covert packet;
extracting covert information from the covert packet; and
demodulating the covert symbols.
95. The method of any of 66-94, further comprising detecting a header error code indicative of the incoming covert packet in the header of the covert packet.
96. The method of any of 66-95, further comprising reading a length of a covert payload and a payload error code, a packet number, and modulation parameters in the header.
97. The method of any of 66-96, further comprising demodulating the covert symbols based on the modulation parameters in the header.
98. The method of any of 66-97, further comprising receiving a further covert data stream of covert data and a further primary data stream of primary I/Q symbols, and embedding the further covert data as covert data symbols within the primary I/Q symbols in a covert packet for transmission to the transmitter.
99. A method of steganographic communication, comprising:
generating a covert packet containing covert data embedded as covert symbols within primary in-phase and quadrature (I/Q) symbols, the covert packet having a data structure comprising a header, a payload, and a payload error detecting code; and
transmitting the covert packet as a radio frequency (RF) transmission.
100. The method of 99, further comprising generating the header to include:
a payload length field containing a total length of the covert payload and the payload error detecting code;
an information field containing information on how to demodulate the covert packet by a receiver; and
a header error detecting code field.
101. The method of any of 99-100, wherein the information field contains a packet number comprising a sequential number to identify the covert packet.
102. The method of any of 99-101, wherein the information field includes a covert modulation scheme identification.
103. The method of any of 99-102, wherein the information field includes covert modulation parameters, the cover modulation parameters including a modulation order, coding map associating covert bit sequences to modulated covert symbols, and a packet type.
104. The method of any of 99-103, wherein the modulation parameters are indicative of an amplitude shift keying modulation scheme, phase shift keying modulation scheme, frequency shift keying modulation scheme, or quadrature amplitude modulation scheme.
105. The method of any of 99-104, wherein the information field includes a modulation scheme identification including modulation schemes such as amplitude shift keying modulation scheme, phase shift keying modulation scheme, frequency shift keying modulation scheme, or quadrature amplitude modulation scheme.
106. The method of any of 99-105, wherein the information field contains a threshold flag indicative of a distance between the covert data symbols on a constellation diagram.
107. The method of any of 99-106, wherein the information field contains an identification of a packet type, wherein the packet type is one or more of an acknowledgement (ACK) message type, a negative-acknowledgement (NACK) message type, a covert data-carrying type, a packet information-carrying type, a challenge message type, a challenge response message type, and an authentication acknowledgement message type.
108. The method of any of 99-107, wherein the packet information-carrying type includes information on source and destination of covert packets and a total number of covert packets in a transmission.
109. The method of any of 99-108, wherein the header error detecting code field contains a cyclic redundancy check code.
110. The method of any of 99-109, wherein the payload error detecting code comprises a cyclic redundancy check code.

111. The method of any of 99-110, further comprising determining if a number of the primary I/Q symbols is large enough to generate the header of the covert packet.
112. The method of any of 99-111, further comprising generating displacements in the primary I/Q symbols in a constellation diagram based on the covert data symbols.
113. The method of any of 99-112, further comprising generating the displacements randomly among a plurality of transmitted covert packets in a transmission stream.
114. The method of any of 99-113, further comprising generating a threshold flag in the header of the covert packet comprising a value indicative of the displacement in the I/Q symbols, and changing the value on a per-packet basis.
115. The method of any of 99-114, further comprising generating covert packet transmissions that mimic wireless channel noise.
116. The method of any of 99-115, further comprising, at a transmitter, transmitting a queue of covert packets to a receiver, located remotely from the transmitter, and waiting a determined time for an acknowledgement message or a negative-acknowledgement message from the receiver.
117. The method of any of 99-116, further comprising transmitting the acknowledgement message and the negative-acknowledgement message as covert packets by the receiver.
118. The method of any of 99-117, wherein the negative-acknowledgement message contains an identification of a data packet that was unsuccessfully decoded or was not received at the receiver.
119. The method of any of 99-118, further comprising, at the transmitter, retransmitting the queue of covert packets to the receiver upon receipt of a negative-acknowledgement message.
120. The method of any of 99-119, further comprising, at the transmitter, retransmitting the queue of covert packets to the receiver upon expiration of the determined time if no acknowledgement message or negative-acknowledgement message has been received at the transmitter.
121. The method of any of 99-120, further comprising, at the transmitter, stopping attempted transmissions of the queue of covert packets after a number of retransmission attempts exceeds a determined threshold.
122. The method of any of 99-121, further comprising mutually authenticating covert messages sent between a transmitter and a receiver located remotely from the transmitter.
123. The method of any of 99-122, further comprising, at the transmitter and/or the receiver, sending covert authentication messages, the covert authentication messages including a type indicator including a challenge type, a challenge response type, and an authentication acknowledgement type.
124. The method of any of 99-123, further comprising, at the transmitter, authenticating the receiver by:
 sending a covert authentication message to the receiver including an authentication code;
 receiving a reply covert message from the receiver including an authentication code result;
 determining if the authentication code result from the receiver matches an expected authentication code result; and
 if the authentication code result matches the expected authentication code result, sending a covert authentication acknowledgement message to the receiver.
125. The method of any of 99-124, further comprising, at the receiver, authenticating the transmitter by:
 sending a further covert authentication message to the transmitter including a further authentication code;
 receiving a further reply covert message from the transmitter including a further authentication code result;
 determining if the further authentication code result from the transmitter matches a further expected authentication code result; and
 if the further authentication code result matches the further expected authentication code result, sending a further covert authentication acknowledgement message to the transmitter.
126. The method of any of 99-125, further comprising:
 scheduling a plurality of primary transmissions each comprising a data stream of primary I/Q symbols;
 generating and embedding a covert packet on a selected one of the primary transmissions; and
 mapping the primary transmissions onto a cellular resource grid for transmission.
127. The method of any of 99-126, further comprising, at a receiver located remotely from a transmitter:
 receiving incoming transmissions from the transmitter;
 detecting a presence of the covert packet;
 extracting covert information from the covert packet; and
 demodulating the covert symbols.
128. The method of any of 99-127, further comprising detecting a header error code indicative of the incoming covert packet in the header of the covert packet.
129. The method of any of 99-128, further comprising reading a length of a covert payload and a payload error code, a packet number, and modulation parameters in the header.
130. The method of any of 99-129, further comprising demodulating the covert symbols based on the modulation parameters in the header.
131. The method of any of 99-130, further comprising receiving a further covert data stream of covert data and a further primary data stream of primary I/Q symbols, and embedding the further covert data as covert data symbols within the primary I/Q symbols in a covert packet for transmission to the transmitter.

DETAILED DESCRIPTION

Figure 1:
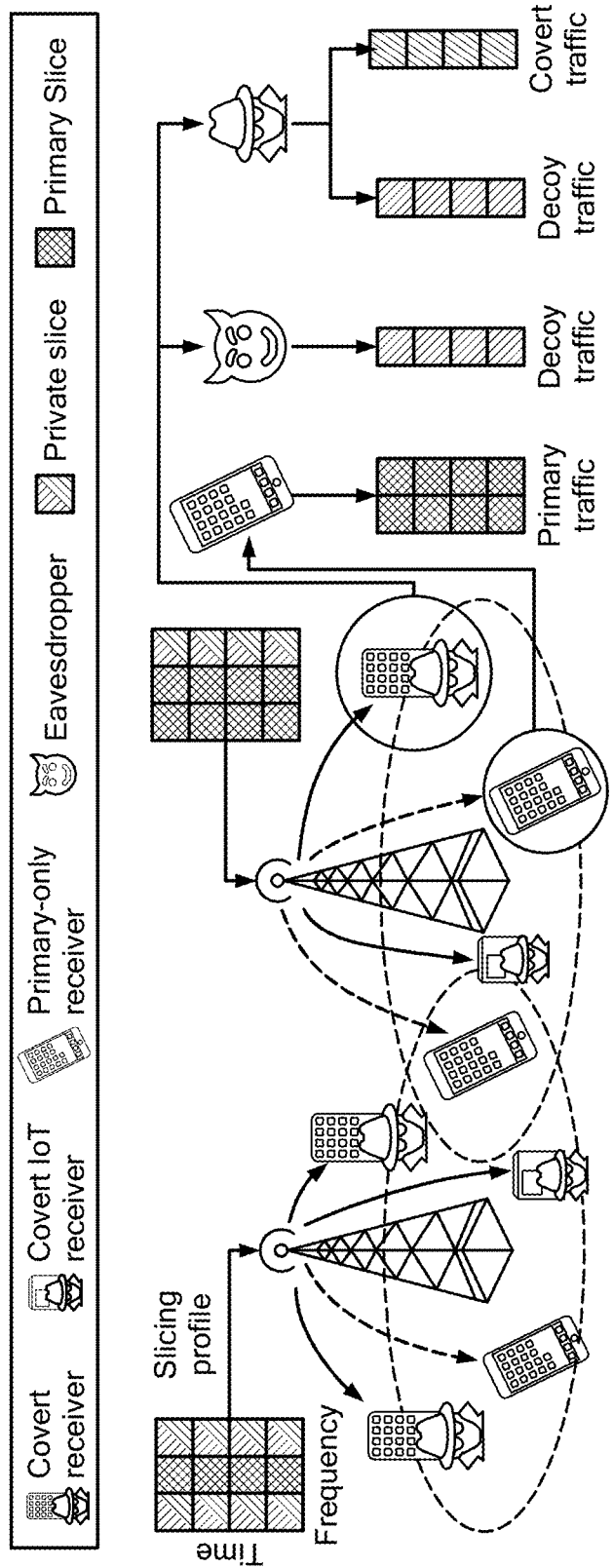
FIG. 1 is a schematic illustration of private cellular connectivity as a service.

Wireless steganography has been used to establish covert communications among two or more parties. Conversely to approaches where covert data is embedded within control fields of transmitted packets (e.g., checksum, flags, and padding fields, among others), wireless steganography introduces tiny displacements in the I/Q constellation plane that can be controlled to encode covert information. For example, frequency/phase shifts, I/Q imbalance, superimposing noisy constellations or training and preamble sequences manipulations can be used. However, these approaches lack reliability. Moreover, they are prone to demodulation errors and rarely support long-range communications, which are quintessential requirements for any communication system.

To some extent, reliability issues have been partially addressed at the higher layers of the protocol stack. For example, Hamdaqa et al. demonstrate a steganographic system over Voice-over-IP (VoIP) systems that encodes covert information by carefully delaying packet transmissions. In this case, reliability and undetectability of covert communications are achieved through Lagrange interpolation techniques. Although this approach is reliable and undetectable, it operates over large temporal windows, which considerably limits the achievable covert rate of the system. Nain et al. develop a steganographic communication system that hides information over chip sequences of IEEE 802.15.4 networks integrating error-coding techniques to mitigate errors. Although being reliable, this solution suffers from low transmission rates.

Wireless steganography has not yet found widespread application in today's networking ecosystem. This is because existing approaches operate at the physical layer only, a condition that makes PCCaaS systems out of reach today.

The present technology can address these shortcomings of low covert throughput or high detectability through statistical analysis (i.e., steganalysis) of transmitted packets and their content, or lack of a practical implementation over real devices demonstrating the effectiveness and feasibility of the approach. Thus, the present technology can provide a steganographic system that can achieve higher throughput, reliability, and undetectability at the same time.

The present technology provides a reliable end-to-end steganographic system (sometimes termed "SteaLTE" herein) for PCCaaS applications demanding high throughput and characterized by mobility, time-varying channels and large distances. The technology can (i) achieve high throughput through wireless steganography; (ii) provide reliable and channel-resilient communications through a combination of error-coding, retransmissions and adaptive covert modulation schemes, and (iii) can be seamlessly integrated within standard-compliant cellular systems.

1. Introduction

The technology described herein can leverage RAN softwarization and network slicing principles in a useful way. Specifically, Private Cellular Connectivity as a Service (PCCaaS) can be concretely realized, where IPs temporarily instantiate and deploy private network slices operating over a common virtualized infrastructure. As described herein, the word private is used to identify slices whose existence is known to a small subset of intended users only, and data is sent wirelessly in a covert and undetectable manner.

PCCaaS can provide additional applications and opportunities in traditional cellular networking. As illustrated in FIG. 1, with PCCaaS law enforcement agencies can leverage the ubiquitous connectivity offered by the already deployed cellular infrastructure and instantiate private slices to establish undetectable communications with undercover agents in the field. These, in turn, can utilize PCCaaS to safely communicate and receive directives from headquarters. Similarly law enforcement can deploy tiny Internet of Things (IoT) devices operating as "bugs", collecting audio and video content, and transmitting it over a private and concealed slice.

Among others, one of the key challenges in realizing PCCaaS is that data transmitted over wireless channels cannot be easily hidden. To address this problem, wireless steganography (from the Greek words στεγανός, meaning "covered, concealed, or protected", and γ ραφη', meaning "writing"), directly operates on RF waveforms by applying hand-crafted tiny displacements to the I/Q symbols being transmitted, also known as primary symbols. While a steganographic receiver can decode the covert information by translating the "dirty" I/Q symbols to a corresponding covert bit sequence, agnostic receivers would be able to decode primary symbols only. As shown in FIG. 1, this feature can be useful in many applications. For example, undercover agents can utilize primary transmissions as "decoy" intelligence, while the actual sensitive information (e.g., the location of a mission target) is sent covertly and can be decoded by the intended receivers only. This way, while the decoy traffic can be eavesdropped by anyone, covert transmissions effectively realize a private slice whose existence is concealed to other users.

Figure 2:
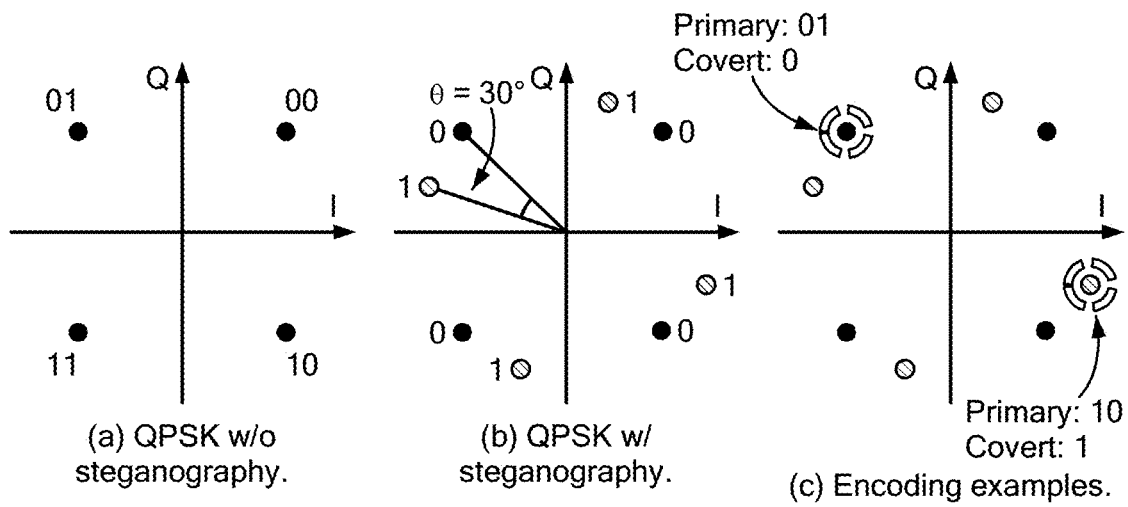
FIG. 2 is a schematic illustration of wireless steganography over a QPSK modulation.

FIG. 2 illustrates a practical example of wireless steganography where covert data is embedded onto a QPSK-modulated signal. Specifically, FIG. 2(a) shows the set of QPSK symbols used to form the primary message. Assume that the transmitter sends the primary symbol "01" to deceive adversaries, but at the same time it wants to embed a covert message in it through wireless steganography. To achieve this, the transmitter can rotate the phase of the I/Q symbols of FIG. 2(a) by an angle θ to send the covert bit "1" (see FIG. 2(b)), while symbols with no rotations correspond to the bit "0" (see FIG. 2(c)). More sophisticated schemes are described in Section 2.2.

The technology described herein provides a steganographic system (sometimes termed "SteaLTE" herein) that can realize PCCaaS-based communications. The technology provides a full-stack approach to steganography, which pushes privacy, confidentiality and cellular communications a step forward by enabling PCCaaS-based communications. The technology can be used with a variety of steganographic modulation schemes.

The technology described herein can provide a variety of technical features and aspects:

End-to-end Reliability and Security: To allow PCCaaS, steganographic communications must be robust against errors and guarantee authentication of trusted parties. To this purpose, a full-stack steganographic system is provided combining existing error correcting codes, adaptive modulation schemes, and Automatic Repeat Request (ARQ) techniques (describer further in Section 2.1). Furthermore, a steganographic mutual authentication mechanism is included where legitimate parties authenticate to each other before exchanging any confidential information (described further in Section 2.1.3). In Section 4, experiments show that by relying on the full-stack steganographic approach, the steganographic system delivered 90% throughput of the primary traffic in 79% of the experiments;

Adaptive Traffic Embedding: Covert traffic has to necessarily be embedded over (primary) cellular traffic. This process is inherently unpredictable; to give an example, activities such as web browsing or sending emails generate a lower amount of primary traffic and smaller data packets than downloading large files or streaming videos on YouTube. Clearly, a large covert data packet cannot be embedded on a small primary packet, or cannot be transmitted at all in the absence of primary traffic. Therefore, covert traffic embedding procedures must be flexible enough to deal with such unpredictability. To this purpose, the steganographic system can provide a covert packet generator component (described further in Section 2.2) that creates and embeds covert packets that seamlessly adapt to primary data traffic.

Standard-Compliant: To successfully operate over existing cellular networks, PCCaaS must adhere to standard protocol implementations regulating transmission and reception operations in 4G/5G systems. As discussed in Section 2.2 and Section 3, the steganographis system can seamlessly integrate with cellular systems in a way that does not disrupt primary communications. In Section 4, experiments show that the decrease in primary throughput due to the steganographic system was below 6% in all of the experiments.

Undetectability: The goal of steganography is to deceive eavesdroppers by letting them overhear intelligible primary transmissions while concealing underlying covert ones. To meet this objective, the technology described herein provides a scheme that adapts covert embedding procedures to hide covert transmissions by mimicking wireless channel noise (described further in Section 2.4). Experiments show that the steganographic system reduced the Kolmogorov-Smirnov (K-S) distance from the "clean" (i.e., without covert data) distribution by 4.8× compared to the state of the art scheme, thus resulting more undetectable.

Prototype: A prototype of PCCaaS-based cellular networking has been implemented (see Section 3). Through extensive experiments (see Section 4), the feasibility and adaptability of the steganographic system's LTE-compliant prototype was demonstrated under diverse network configurations (e.g., topology, traffic pattern, and mobility). The experiments show that the steganographic system delivered covert throughput as high as 5.21 Mbps, minimally impacted primary transmissions with up to 6% primary throughput loss and reaching up to 852 ft distance.

The technology described herein provides a system that can realize Private Cellular Connectivity as a Service (PCaaS)-based communications for 5G networks. The technology can improve privacy, confidentiality and cellular communications by enabling PCCaaS-based communications, where infrastructure providers deploy covert network slices whose existence is known only to a subset of receivers. The technology can implement a full-stack steganographic system with packet schedulers and procedures to properly embed covert data streams on top of traditional 4G/5G cellular traffic. The technology can be applicable to law enforcement and first-responder users that require access to commercial cellular networks with additional security guarantees.

The technology can provide a variety of embodiments, features, and aspects. The technology can provide a full-stack steganographic system with packet schedulers and procedures to properly embed covert data streams on top of traditional cellular traffic, i.e., primary traffic. The steganographic system can combine error correcting codes, adaptive modulation schemes, and automatic repeat request (ARQ) techniques, and can include a steganographic mutual authentication mechanism where legitimate parties authenticate to each other before exchanging any confidential information. Since covert data has to necessarily be embedded over primary cellular traffic, which is inherently unpredictable, the covert traffic embedding procedures can be flexible enough to deal with such unpredictability. To this purpose, the system can include a covert packet generator component that can create and embed covert packets that seamlessly adapt to primary data traffic. To successfully operate over existing cellular networks, PCCaaS must adhere to standard protocol implementations regulating transmission and reception operations in 4G/5G systems. The steganographic system can be LTE-compliant and can seamlessly integrate with cellular systems in a way that does not disrupt primary communications. To enable undetectability of the system's covert communications, a scheme can be provided that adapts covert embedding procedures to hide covert transmissions by mimicking wireless channel noise.

The technology can implement a full-stack steganographic system with packet schedulers and procedures to properly embed covert data streams on top of traditional cellular traffic, i.e., primary traffic, thus enabling PCCaaS communications. The technology can provide a covert packet generator component that creates and embeds covert packets that seamlessly adapt to primary data traffic. The technology can be compliant with 4G/5G cellular systems. The technology does not need to disrupt communications of standard cellular users. The technology can enable undetectable and private covert communications that adapt covert embedding procedures to hide covert transmissions by mimicking wireless channel noise.

The technology can be used with fifth-generation (5G) systems that employ radio access network (RAN) softwarization. This can allow the instantiation of "virtual cellular networks" running on shared physical infrastructure. The technology can employ RAN softwarization to use the concept of Private Cellular Connectivity as a Service (PCCaaS), where infrastructure providers deploy covert network slices whose existence is known only to a subset of receivers. The technology can provide a PCCaaS-enabling system for cellular networks. The technology can utilize wireless steganography to disguise data as noise to adversarial receivers. The technology can take a full-stack approach to wireless steganography, which enables several technical aspects, including: (i) An LTE-compliant steganographic protocol stack for PCCaaS-based communications, and (ii) packet schedulers and procedures to properly embed covert data streams on top of traditional cellular traffic, i.e., primary traffic. The technology can balance undetectability and performance by providing a mechanism that mimics channel impairments so that received waveforms are almost indistinguishable from noise. The technology can operate under different traffic profiles, distance and mobility patterns.

The technology can enable Private Cellular Connectivity as a Service (PCCaaS) in cellular networks. The technology can enable private and secure communications among cellular networks users. The technology can be used by a variety of users, such as secure law enforcement and first responders who communicate through covert communications over 5G systems. The technology can operate between Infrastructure Providers (IPs) and Mobile Virtual Network Operators (MVNOs). The technology can provide an effective solution to the deployment of private cellular networks. The technology can introduce an additional layer of security through steganography and covert communications.

2. Steganographic System Design and Features

In this section, embodiments, features, and applications of a steganographic system and method are described. An overview of covert communication procedures is given in Section 2.1. The steganographic system transmitter and receiver are described in Section 2.2 and Section 2.3, respectively. Mechanisms to enable undetectable covert communications in are described Section 2.4.

2.1 Covert Communication Procedures

A full-stack end-to-end steganographic system over cellular networks is provided that can take into consideration that primary traffic is dynamic, unpredictable, and strongly depends on the corresponding application. For instance, applications such as online video streaming and web browsing generate substantially different traffic patterns and demand. The steganographic system can provide an adaptive traffic embedding mechanism which generates covert packets in real-time according to the current availability and size of primary data. In the remainder of this section, some low-level structures and operations of the steganographic system are described to provide an understanding of the higher level aspects and procedures that allow the steganographic system to enable PCCaaS-based secure and reliable covert communications in cellular networks.

Figure 3:
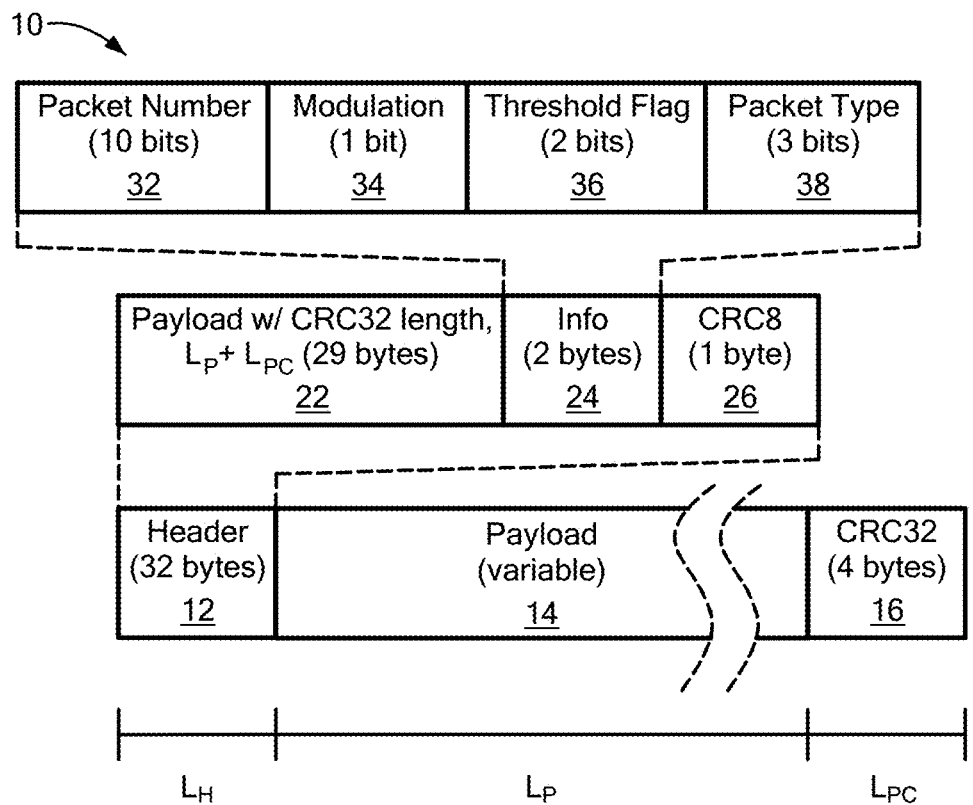
FIG. 3 is an illustration of a steganographic system covert packet structure.

2.1.1 Packet Format. The structure of the covert packets is illustrated in FIG. 3. Each packet 10 includes three elements: A header 12, a payload 14, and a corresponding error detecting code 16, e.g., the corresponding Cyclic Redundancy Check (CRC).

Header. The header includes 32 bytes carrying information on how to decode the received packet. To facilitate packet detection and demodulation at the receiver side, the header is modulated through a fixed covert modulation known by the receiver (see Section 2.2.1 for more details on different covert modulation schemes). Its structure is as follows: (i) A 29-byte field 22 indicating the total length of the covert payload ($L_P$) and its CRC ($L_{PC}$); (ii) a 2-byte information ("info") field 24 with information on how to correctly demodulate the remainder of the received covert packet, and (iii) a 1-byte error detecting code, e.g., CRC8, field 26 to detect errors on the header. In more detail, the info field contains:

Packet Number: A packet number field, 32, contains a 10-bit sequential number to uniquely identify each packet. Being unique, this field is utilized to identify missing packets and establish reliable communications between transmitters and receivers. In case of lost data packets, the receiver sends the transmitter the list of missing packet numbers, which can be ultimately retransmitted (see Section 2.1.2).

Modulation: A 1-bit field, 34, indicates the modulation utilized to encode the payload and its CRC. In the steganographic system, two covert modulation schemes can be selected according to the quality of wireless channel conditions. This field can be easily extended to 2 or more bits to account for more covert modulation schemes. More details are given in Section 2.2.1.

Threshold Flag: A 2-bit field, 36, instructs the receiver on how to set demodulation parameters and properly decode received packets. This field enables the implementation of the undetectable scheme. Its usage is explained in greater detail in Section 2.4.

Packet Type: A 3-bit field, 38, distinguishes among data and control packets. The different packet types and their flags are shown in Table 1. Packet types 0 and 1 are acknowledgement (ACK) and negative-acknowledgement (NACK) messages, respectively. They are sent by the receiver to give feedback on the covert transmission (see Section 2.1.2). Packets carrying covert data have packet type 2, while a packet of type 3 carries information on (i) source and destination of covert packets, and (ii) total number of packets in the current transmission. Specifically, each source and destination address is encoded in 5 bytes containing the corresponding Mobile Subscription Identification Number (MSIN) (i.e., the telephone number commonly used to identify mobile subscribers). Upon the reception of an uplink covert transmission, the Base Station (BS) maps the destination MSIN to the corresponding International Mobile Subscriber Identity (IMSI), which univocally identifies User Equipment (UE) in cellular networks. It, then, relays the covert message to the receiver through a downlink covert transmission (or forwards it to a steganographic system BS that is serving the receiver, as happens for regular voice traffic). Packets of type 4, 5 and 6 are used during the mutual authentication procedures among covert transmitters and receivers (see Section 2.1.3). Finally, packet type 7 is reserved for future use.

TABLE 1

Steganographic System Packet Types

| Packet Type | Flag | Description |
| --- | --- | --- |
| 0 | 000 | ACK |
| 1 | 001 | NACK |
| 2 | 010 | Data |
| 3 | 011 | Source/Destination and Packet Info |
| 4 | 100 | Challenge |
| 5 | 101 | Challenge Response |
| 6 | 110 | Authentication ACK |
| 7 | 111 | Reserved for future use |

Payload and CRC32. The payload of the packet is of variable size and contains user data to be transmitted to the covert receiver. Being of variable size, this field is adapted to the size of the primary traffic to improve the efficiency of covert communications (see Section 2.2.1). To facilitate receive operations, the exact length of this field is included in the header of the packet (see FIG. 3). The packet ends with a 4-byte CRC32 field that is utilized to detect errors and to guarantee data integrity of covert transmissions.

Figure 4:
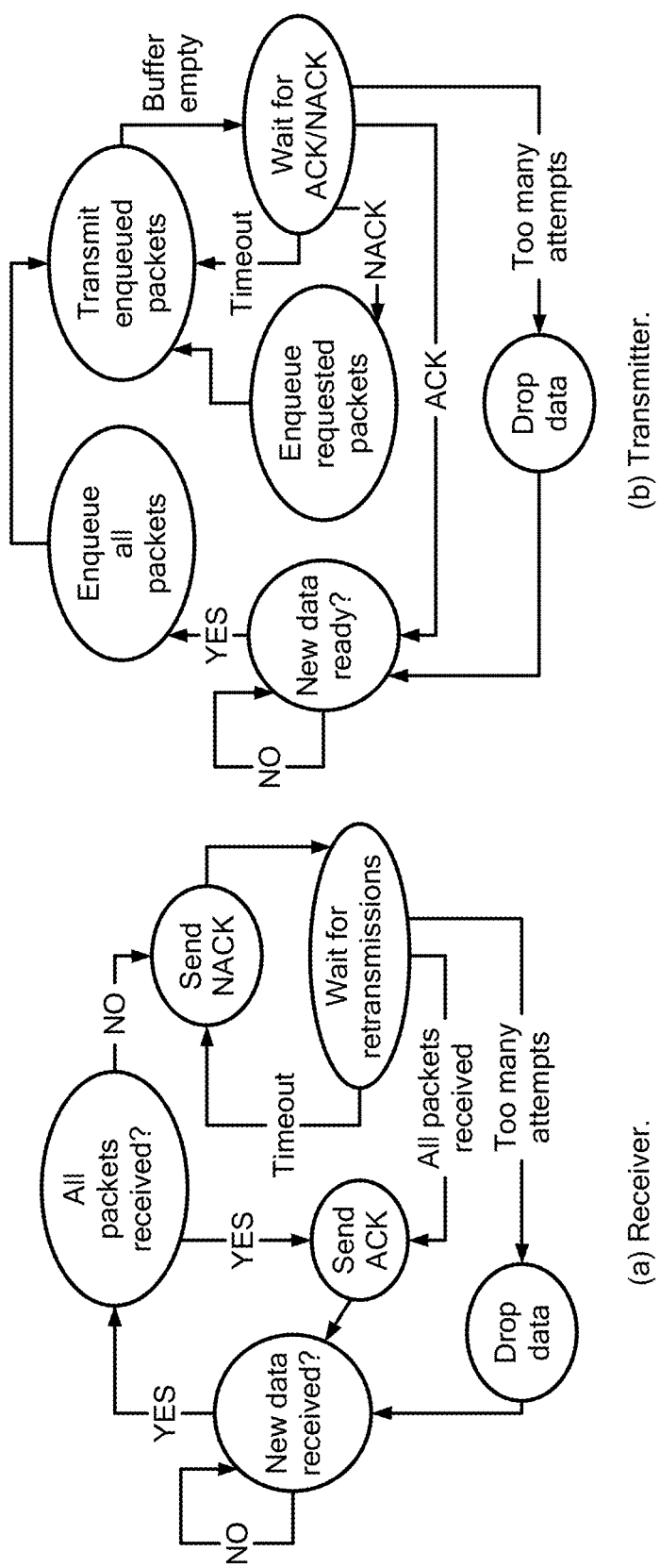
FIG. 4 is a schematic illustration of a state machine for steganographic system communications.

2.1.2 Reliable Covert Communications. In the context of steganographic communications, reliable exchange of information among two or more parties is significantly challenging as reliability must be extended to the covert channel. To this purpose, the steganographic system provides built-in reliability through the combination of ARQ mechanisms, such as acknowledgements and retransmissions, and error-detecting codes. State machine diagrams for these procedures (at both receiver and transmitter sides) are illustrated in FIG. 4, and are detailed in the remaining of this section.

Acknowledgements. They are implemented through ACK and NACK messages generated by the receiver (see FIG. 4a). These are transmitted as covert packets of type 0 and 1, respectively. ACK messages notify the transmitter that all packets have been received correctly; NACK messages, instead, contain the packet number (see FIG. 3) of data packets that were either unsuccessfully decoded, or not received at all. Their purpose is to ask the covert transmitter to retransmit them. Note that a single NACK packet can be used to request the retransmission of multiple data packets; conversely, ACK messages do not carry any payload.

Retransmissions. As soon as all the packets in the transmission buffer have been sent, the transmitter enters the state "wait for ACK/NACK" (see FIG. 4b). In this state, one of the following events can happen:

ACK is received: the receiver notifies the transmitter that all packets have been successfully received. The transmitter enters the state "new data ready?" waiting for new covert data to send.

NACK is received: the transmitter retransmits the missing packets contained in the NACK message and returns to state "wait for ACK/NACK".

Timeout expires: the transmitter has not received any ACK or NACK messages. When this timeout expires, the transmitter retransmits all packets previously contained in the transmission queue, and returns to state "wait for ACK/NACK".

Too many retransmission attempts: when the number of retransmission attempts exceeds a threshold, the transmitter drops the current covert data and proceeds to the next covert transmission (a similar procedure applies to the receiver side). This is done to prevent deadlocks in the case, for instance, of nodes experiencing poor channel conditions, or moving outside each other's coverage range. In this case any packet transmission attempt would be unsuccessful and, thus, the steganographic system interrupts retransmission procedures.

Error-detecting Codes. The steganographic system leverages Cyclic Redundancy Check (CRC) codes of different length to detect errors in the received covert packets: A CRC8 code is used to encode the header of the packet, while a CRC32 is used for the packet payload. When there is a new covert packet to send, the covert transmitter divides the payload by a generator polynomial of degree 32 (shared a priori with the covert receiver) and stores the division remainder in the payload CRC32 field (see FIG. 3). At the receiver side, an analogous operation is performed to validate the received packet. Similar considerations apply for the packet header, that is encoded with a generator polynomial of degree 8 (see FIG. 3).

Figure 5:
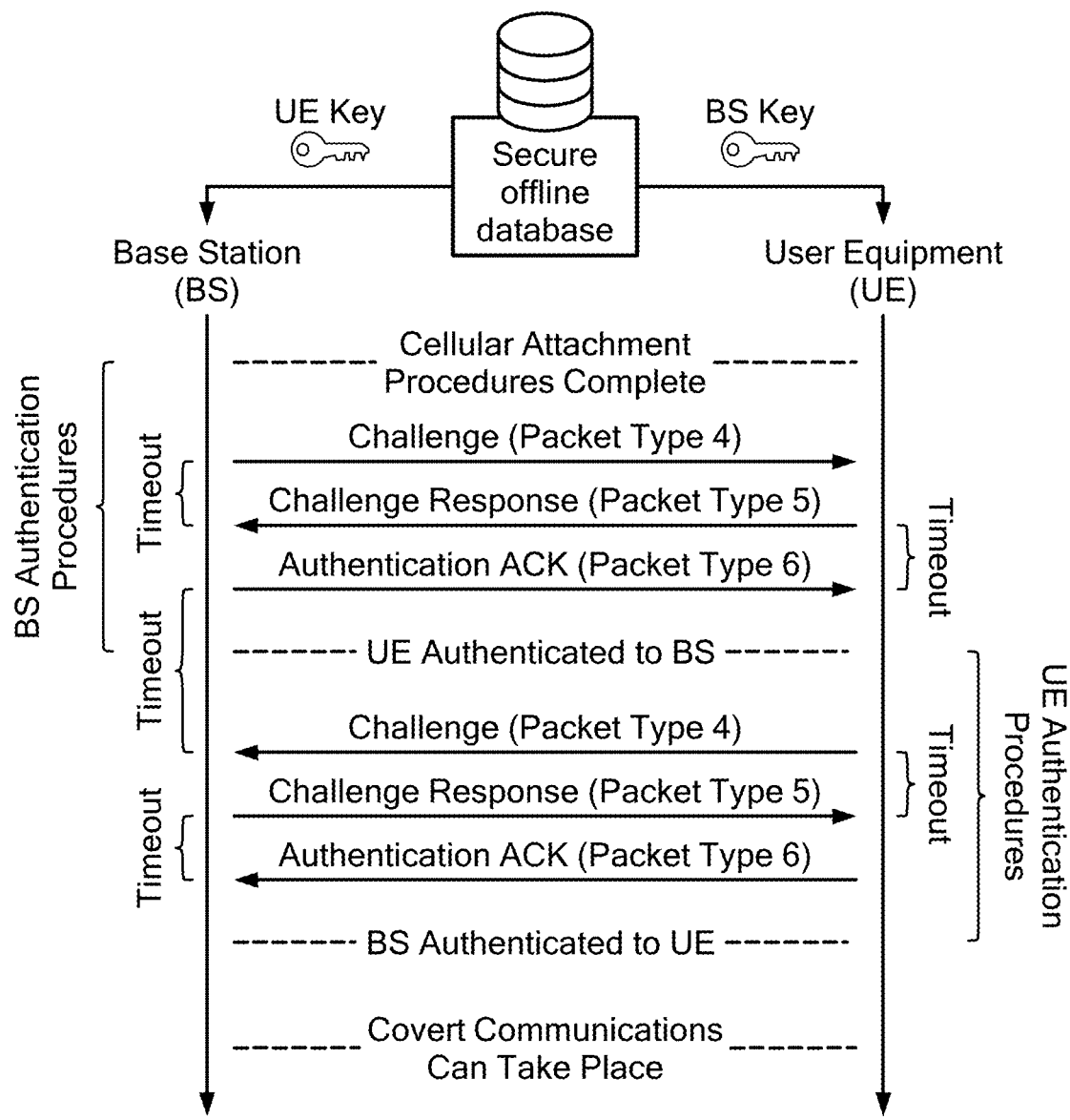
FIG. 5 illustrates mutual authentication procedures between BS and UE of the steganographic system.

2.1.3 Mutual Authentication. The steganographic system implements a scheme for the mutual authentication of BSs and UEs through the challenge/response operations depicted in FIG. 5.

After standard cellular attachment procedures have been completed, the BS sends a randomly-generated challenge to the UE through a packet of type 4 (see Table 1). Upon reception of this message, the UE computes the Keyed-hash Message Authentication Code (HMAC) from the BS challenge using the BS key (pre-shared, for instance, through a secure offline database), and sends the HMAC result as the challenge response through a covert packet of type 5. After receiving the response from the UE, the BS compares it with the expected HMAC result. If the two match, the BS considers the UE authenticated. To notify the successful end of the UE authentication procedures, the BS sends an authentication ACK message to the UE through a packet of type 6. Note that if the challenge response is not received, the BS retransmits the challenge to the UE. After a certain number of challenges have been resent to the UE without receiving any response, or if the UE sends an erroneous challenge response, the BS considers the UE not authenticated, and defers from any covert communication with it. When the UE receives the authentication ACK from the BS, it follows analogous procedures to authenticate the BS.

2.2 Transmitter

Figure 6:
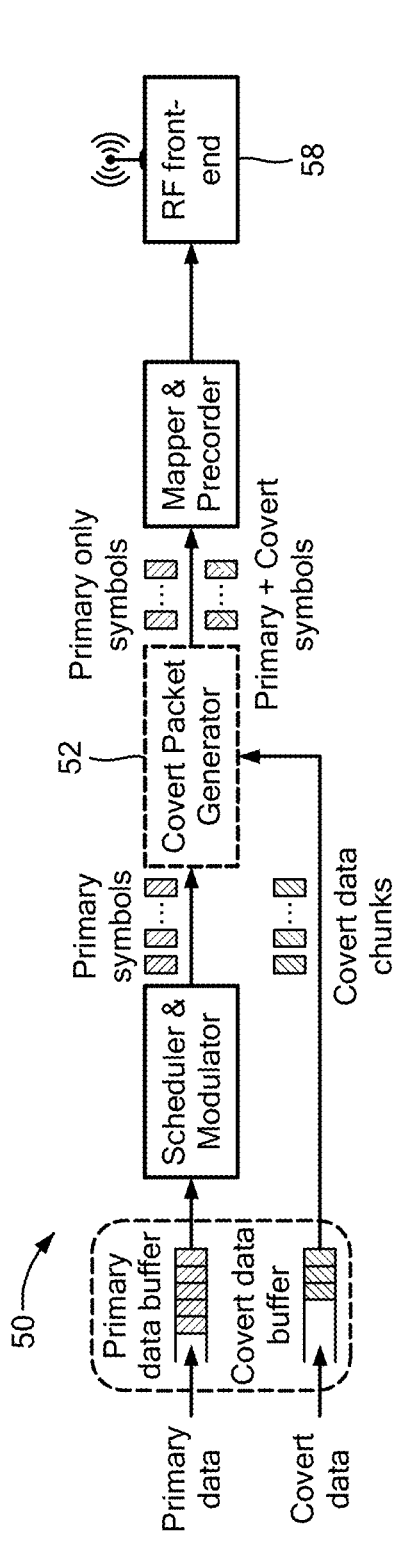
FIG. 6 is a schematic illustration of an embodiment of a high-level transmitter for the steganographic system.
Figure 7:
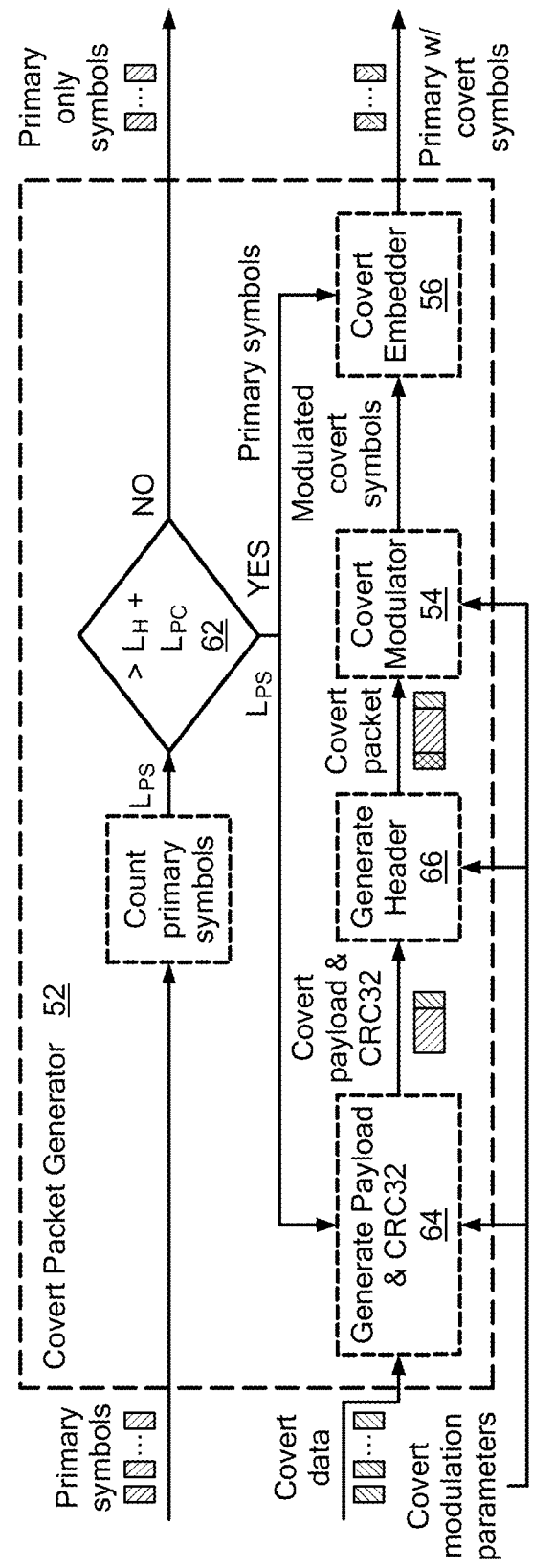
FIG. 7 is a schematic overview of a covert packet generator block.

As shown in FIGS. 6 and 7, embodiments of a transmitter 50 for a steganographic system can include a covert packet generator 52, a covert modulator 54, and a covert embedder 56. In the figures, blocks with dashed lines denote components pertinent to the steganographic system. Other blocks identify standard cellular components that do not require any hardware/software modification.

FIG. 6 provides a high-level overview of the building blocks of the steganographic system transmitter 50. Primary and covert data streams are separate and independent from one another. Primary data is processed through standard scheduling and signal processing procedures (e.g., modulation) of the primary system. This data results in a sequence of primary symbols which are fed to the steganographic system covert packet generator 52 (Section 2.2.1). After covert symbols have been embedded, they are mapped and precoded according to standard cellular procedures (see Section 3), and transmitted through the RF front-end 58.

2.2.1 Covert Packet Generator. The covert packet generator 52 reads covert data from the covert data buffer, and embeds it on the modulated primary symbols. This is achieved by executing the following three steps (see FIG. 7): (i) Verifying that there are enough primary symbols to embed a complete covert packet; (ii) generating covert symbols to be transmitted, and (iii) embedding them into primary ones.

First, the covert packet generator 52 verifies, at decision block 62, that the number of primary symbols $L_{PS}$ is large enough to accommodate at least $L_{min}$=36 bytes, which are required to build the covert packet header ($L_H$=32 bytes), and the CRC32 field ($L_{PC}$=4 bytes). If there are enough primary symbols, it generates the covert packet payload and CRC32 field, at block 64. The length of the payload and of the CRC32 are included in the packet header, together with the covert modulation parameters (e.g., the modulation order, and packet type), at block 66, as described in Section 2.1.1. The generated packet is then modulated through the covert modulator 54 according to the set covert modulation parameters. Finally, the resulting covert modulated symbols are embedded in the primary symbols through the covert embedder 56. Otherwise, if $L_{PS} \leq L_{min}$, no covert data is embedded in the primary traffic. Note that the adaptive structure of the covert packets allows for embedding variable size covert data on top of time-varying and unpredictable primary traffic. This feature makes the steganographic system transparent to primary traffic dynamics, thus enabling the integration of the steganographic system with any 4G/5G cellular system.

Covert Modulator. The covert modulator 54 is in charge of encoding covert packets into covert symbols that can be embedded into primary transmissions (see FIG. 7).

Figure 8:
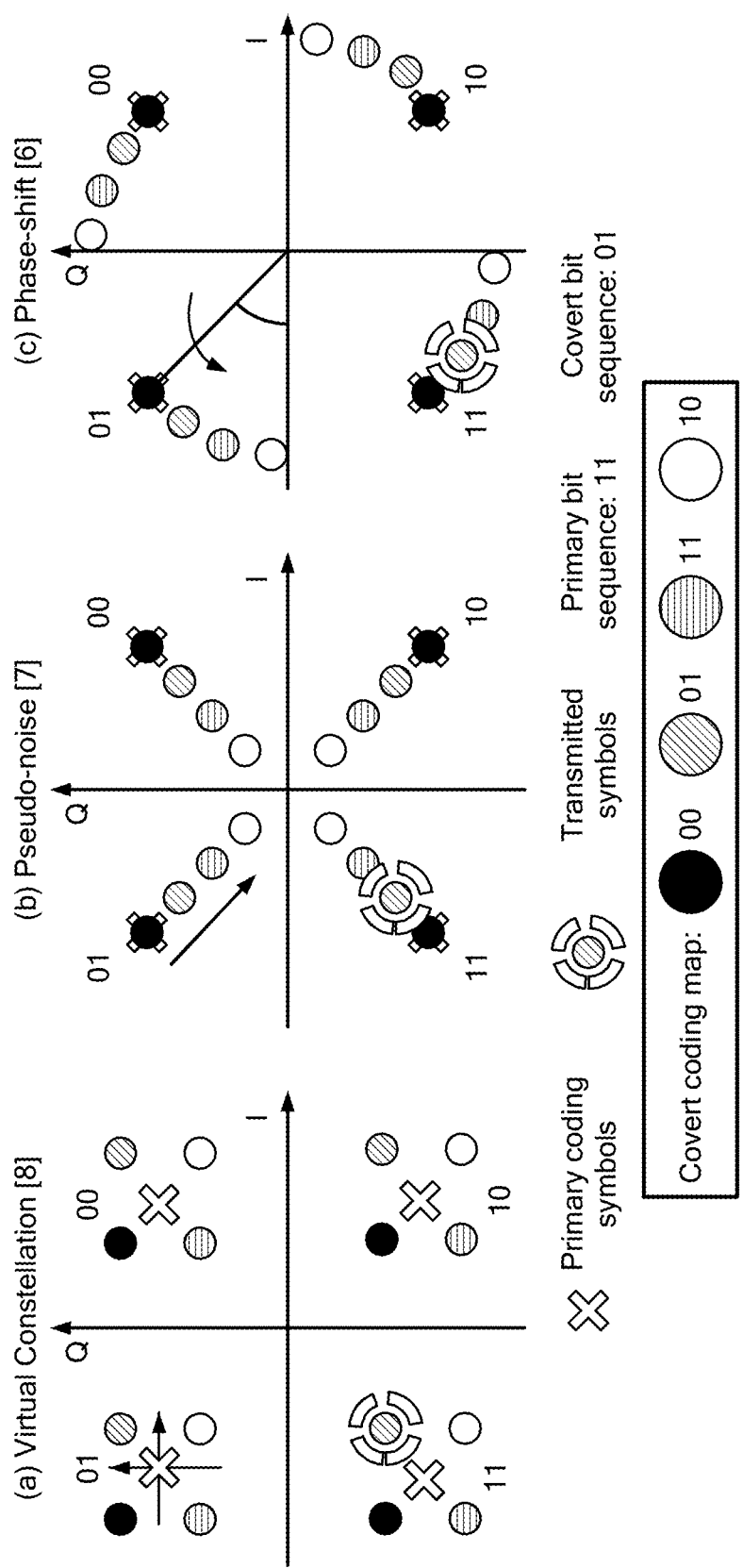
FIG. 8 illustrates approaches to wireless steganography: (a) virtual constellation; (b) pseudo noise; (c) phase-shift.

Several approaches can allow covert embedding of data through wireless steganography. FIG. 8 illustrates three examples in which 2 covert bits are added on top of a primary QPSK. The first approach generates a "dirty" QPSK constellation around each primary symbol (FIG. 8*a*), mimicking a hierarchical constellation on top of the primary QPSK constellation. The second one introduces a hierarchical Amplitude Shift Keying (ASK) modulation manipulating the amplitude of the primary constellation (FIG. 8*b*) such that different amplitude values encode different covert bit sequences. Finally, the third one modifies the phase offset of the primary symbol (FIG. 8*c*) in a way that each phase rotation encodes a specific bit sequence.

Given that it is not tied to any specific steganographic procedure, the steganographic system covert modulator block can support any of these approaches. For illustration purposes, in the following it is assumed that the covert modulator block implements the ASK approach depicted in FIG. 8*b*. The advantage of this approach—which for simplicity will be referred to as $M_C$-ASK, with $M_C$ being the number of symbols in the covert constellation—is that: (i) it is robust against phase rotations introduced by fading; (ii) it supports high-order modulation schemes (thus resulting in high covert data rate); and (iii) it can be seamlessly integrated with OFDM systems such as those of 4G/5G cellular networks. The covert modulator receives the generated covert packets together with the set of covert modulation parameters, which specify the modulation order (i.e., the modulation bit is set to 0 for 2-ASK, and to 1 for 4-ASK), the corresponding coding map, and the packet type (see FIG. 7). The coding map uniquely associates covert packets (i.e., bit sequences) to modulated covert symbols. Covert symbols are, then, embedded in primary symbols through the covert embedder block.

Covert Embedder. Once covert symbols have been generated, the covert embedder 56 embeds them (see FIG. 7). Similarly, this procedure modulates the amplitude of the primary symbols based on the amplitude of the modulated covert symbols (by each covert symbol). The output is a sequence of primary symbols with embedded covert data. The symbols are then processed by mapping and precoding blocks and transmitted through the RF front-end (see FIG. 6).

2.2.2 Downlink and Uplink Procedures. The steganographic system can run seamlessly on both downlink and uplink transmissions, and does not depend on the employed Medium Access Control (MAC) strategy (e.g., TDD/FDD, OFDMA/SC-FDMA). FIG. 9 illustrates a high-level overview of both downlink (BS side), and uplink (UE side) procedures.

Figure 9A:
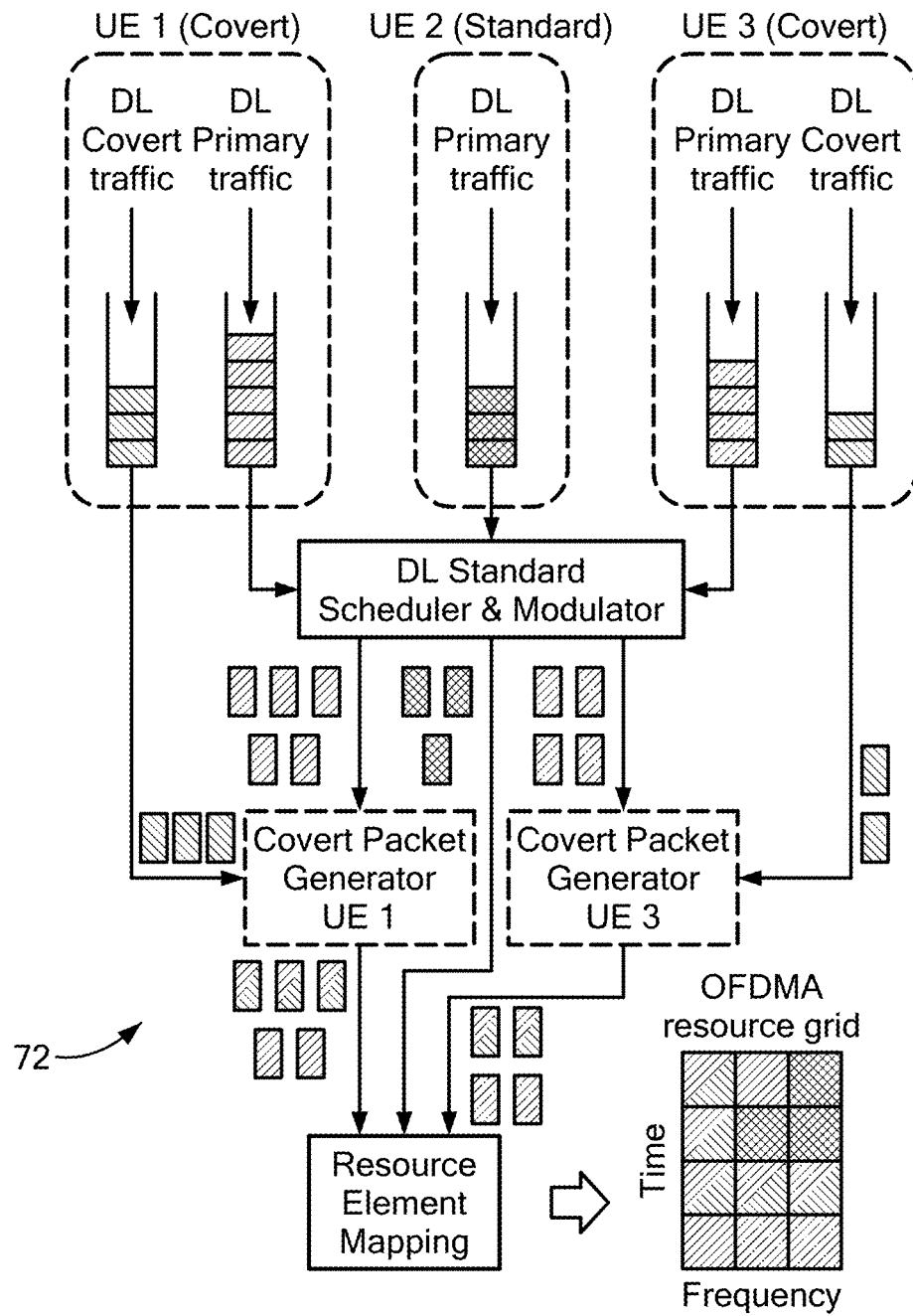
FIG. 9A is a schematic illustration of a high-level steganographic system downlink (DL) transmitter embodiment.

FIG. 9A shows an embodiment of a downlink transmitter 72 at the BS. In this example, the BS is serving three subscribers: two covert users (i.e., UE 1 and UE 3, which it is assumed are already mutually authenticated with the BS), and a standard user (i.e., UE 2). After scheduling the primary transmissions of all three users through typical cellular procedures, the BS generates the covert packet to embed on the primary traffic of UE 1 and UE 3 (see Section 2.2.1). After doing this, the data for the three users is mapped on the cellular resource grid (e.g., the OFDMA resource grid in case of downlink LTE transmissions), and transmitted.

Figure 9B:
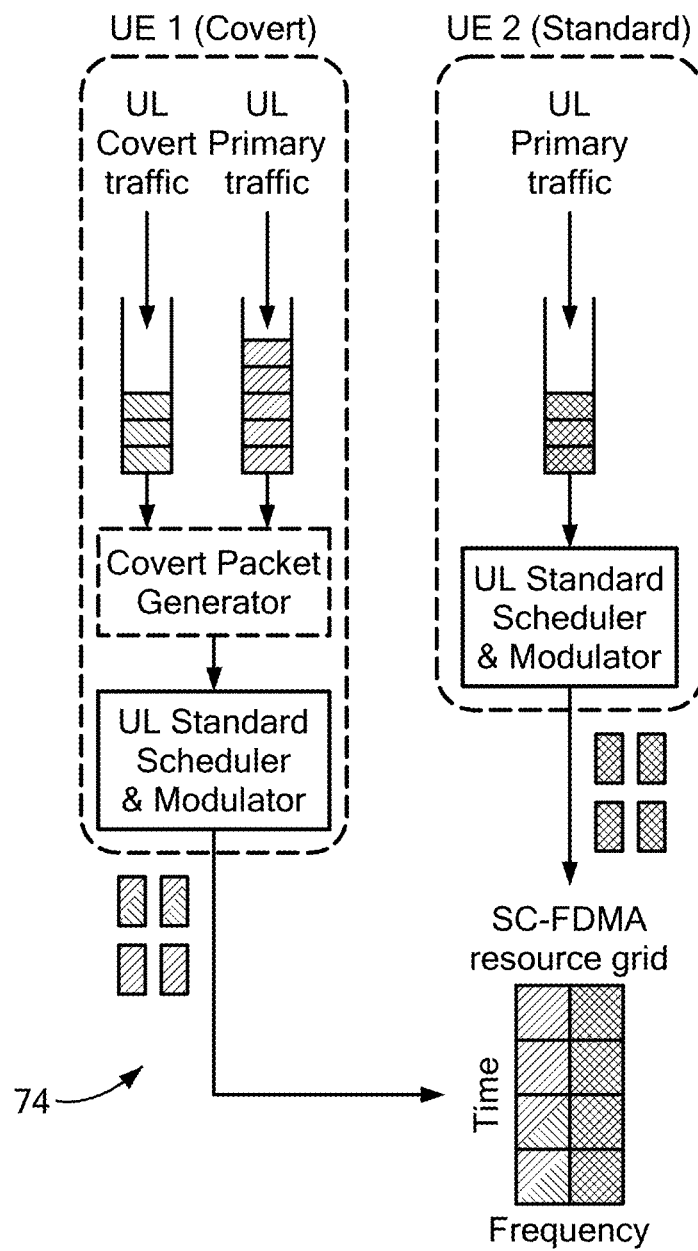
FIG. 9B is a schematic illustration of a high-level steganographic system uplink (UL) transmitter embodiment.

An embodiment of a high-level uplink transmitter 74 is shown in FIG. 9B, where two users are connected to a steganographic BS: UE 1, which is a covert user, and UE 2, which is a standard user. After completing the mutual authentication procedures, UE 1 generates and embeds the covert packets in the primary uplink traffic to send to the BS. Then, UE 1 schedules the primary uplink transmission with embedded covert data on the cellular resource grid (e.g., SC-FDMA grid in case of LTE networks). On the other hand, UE 2, which is not aware of the ongoing covert communications, schedules its uplink transmission according to standard cellular procedures.

2.3 Receiver

Figure 10:
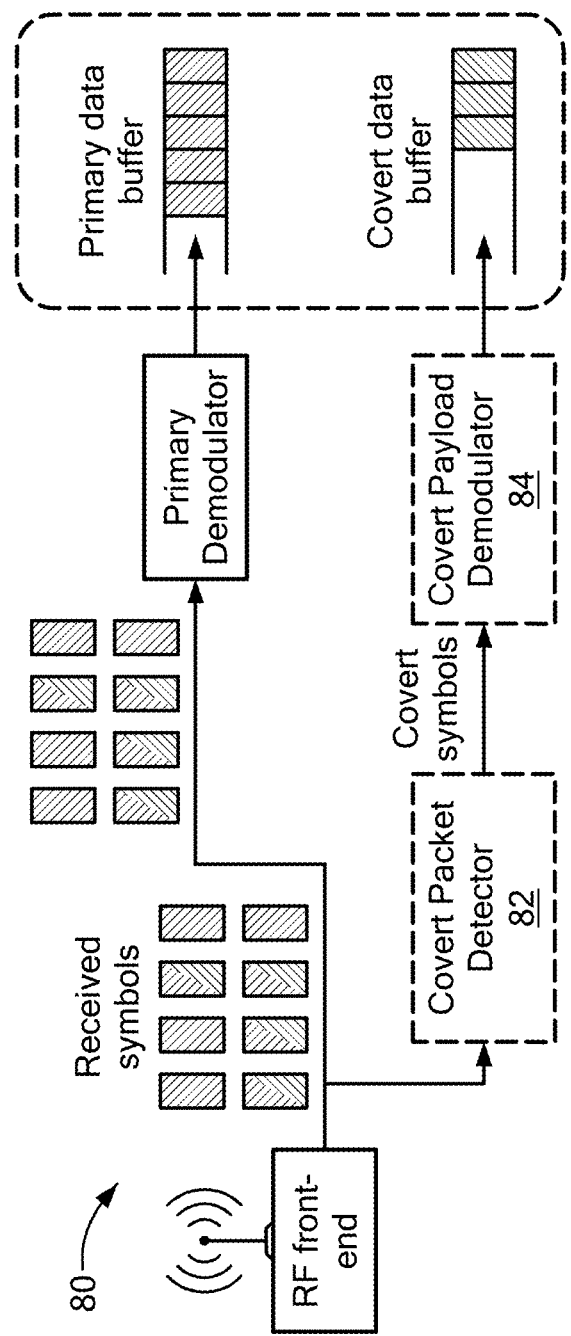
FIG. 10 is a schematic illustration of a high-level steganographic system receiver embodiment.

FIG. 10 shows an embodiment of a receiver 80. Primary data is processed as per standard cellular procedures. On the other side, covert data follows a separate processing chain that includes two main components: a covert packet detector 82 and a covert payload demodulator 84.

2.3.1 Covert Packet Detector. The covert packet detector 82 detects the presence of covert packets by trying to demodulate the covert packet header contained in the first $L_H$ bytes of the covert packet. As mentioned in Section 2.1.1, the header of covert packets is modulated through a covert 2-ASK modulation. Thus, if the CRC8 check described in Section 2.1.2 passes, the receiver assumes a covert packet has been received.

Upon detecting a covert packet, the covert packet detector 82 reads the length of the covert payload and CRC32 fields (i.e., $L_P + L_{PC}$), the packet number and the modulation parameters contained in the info field of the header (see FIG. 3). Then it extracts the symbols corresponding to the encoded $L_P + L_{PC}$ bytes of the covert packet, that will be demodulated by the covert demodulator 84 of Section 2.3.2.

2.3.2 Covert Demodulator. The covert demodulator 84 extracts the encoded covert information from each packet.

As shown in FIG. 3, covert modulation parameters necessary to demodulate covert packets, such as employed covert modulation, packet length, and the packet type, are specified in the header. This way, the demodulator block can reconstruct the decoding map and use it to demodulate the received symbols into covert data (e.g., bit sequence). Specifying the covert modulation parameters in the header of each packet allows the receiver to reconstruct the transmitted covert data without any further interaction between transmitter and receiver. As shown in Section 2.4, this approach also enables time-varying coding/decoding mappings that make covert transmissions undetectable and secure against eavesdroppers. Finally, the received CRC32 value is checked (see Section 2.1.2). If the check passes, the data is saved, otherwise its retransmission will be requested through a NACK.

2.4 Undetectable Covert Communications

Utilizing steganography may expose the system to steganalysis attacks. Through steganalysis an eavesdropper may analyze the statistical properties of the captured I/Q samples and infer whether there is an anomaly suggesting the presence of a covert slice.

Figure 11:
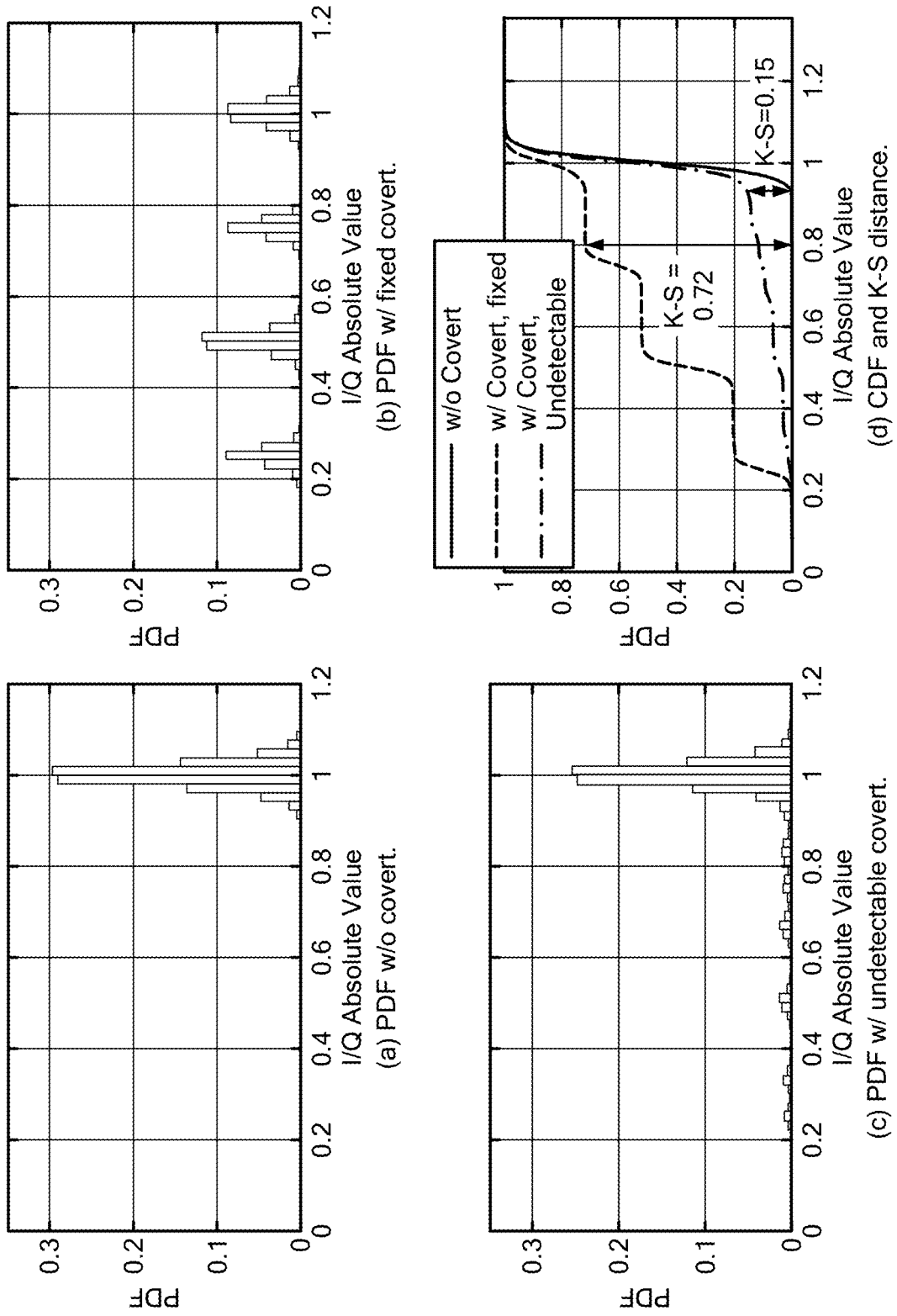
FIG. 11 illustrates graphs of PDF and CDF of received I/Q samples: (a) PDF without covert; (b) PDF with fixed covert; (c) PDF with undetectable covert; (d) CDF and K-S distance.

For example, consider the case of primary QPSK transmissions where the steganographic system embeds covert data through a 4-ASK covert modulation scheme. FIG. 11 shows the Probability Density Function (PDF) of the I/Q samples captured through the testbed described in Section 4.1 in three different cases: (i) Primary transmissions only (FIG. 11a); (ii) primary with fixed (detectable) 4-ASK covert transmissions (FIG. 11b), and (iii) primary with steganographic undetectable covert transmissions (FIG. 11c). Additionally, the corresponding Cumulative Distribution Function (CDF) and Kolmogorov-Smirnov (K-S) distances for all the above cases are shown in FIG. 11d. FIG. 11a shows the PDF of the absolute value of the captured primary I/Q samples without any covert transmission. As expected, the PDF assumes a Gaussian distribution with mean 1 due to noise and fading. FIG. 11b shows the PDF when covert data is embedded through a 4-ASK covert modulation. Comparing FIG. 11b with the primary-only case of FIG. 11a, it can be noticed that the absolute value of the captured samples no longer exhibits a Gaussian PDF centered around 1, but multiple bell-shaped Gaussian curves centered at 0.25, 0.5, 0.75, and 1. This is also illustrated in FIG. 11d where the CDF of the received I/Q samples resembles a step function with a K-S distance with the primary-only case equal to 0.72.

Such a statistical behavior is inherited from the 4-ASK covert scheme in FIG. 8b, whose functioning results in 4 covert points per primary symbol with amplitude equal to 0.25, 0.5, 0.75, and 1. Steganalysis can easily identify such an abnormal statistical pattern, thus raising the eavesdropper's concerns about the existence of ongoing covert transmissions. However, for steganographic communications to be undetectable, they must statistically behave like primary ones. In practice, this is achieved by reducing the value of the K-S distance.

Figure 12:
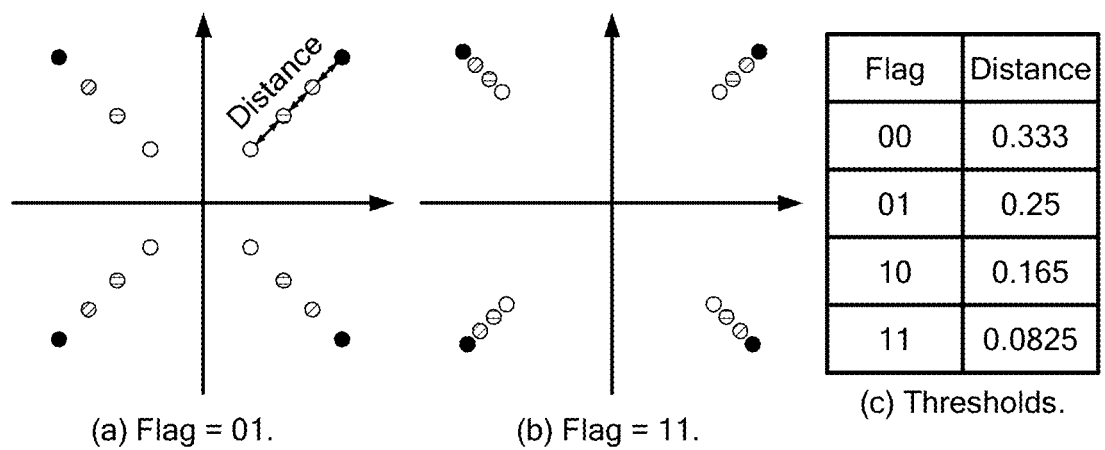
FIG. 12 illustrates examples of covert 4-ASK constellations with different distances and threshold flag values.

For this reason, the steganographic system implements a mechanism that "mimics" I/Q displacements introduced by noise on the wireless channel by randomizing the covert embedding procedures. Rather than utilizing a fixed distance between covert symbols, the steganographic system randomly changes the distance between the covert symbols, providing the undetectability mechanism. An example of this mechanism is shown in FIG. 12, where 4 possible configurations of a 4-ASK covert constellation are shown.

To decode covert ASK messages, the receiver must be aware of the distance between covert symbols. As a consequence, randomizing the covert constellation at the transmitter side could potentially undermine the receiver's covert demodulation procedures. To overcome this problem, the packets carry a threshold flag field (see Section 2.1.1) instructing the receiver on the covert constellation used by the transmitter. The value of this flag is changed on a per-packet basis, thus reducing the probability of successful steganalysis attacks. In one implementation of the steganographic system, this field includes 2 bits encoding the 4 different distance configurations shown in FIG. 12c. However, it is straightforward to increase the size of this field and consider more covert constellation configurations to further increase undetectability. To demonstrate the effectiveness of this approach, in FIG. 11c, the PDF of the steganographic system undetectable covert messages is shown. There, the absolute value of the captured I/Q samples is centered around 1, while the remaining small peaks are hardly distinguishable from noise introduced by the wireless channel. The same behavior can also be observed in the CDF of the primary I/Q samples shown in FIG. 11d. When compared with the CDF of the primary-only LTE transmissions (solid line), the CDF of the covert signal not only does not show the steps observed with fixed displacements (dashed line), but it also results in a 4.8× shorter K-S distance.

EXAMPLES

A prototype of an end-to-end reliable steganographic cellular system has been implemented and its performance assessed through experiments on over-the-air LTE-compliant, and long-range 5G testbeds.

3. Steganographic System Prototype

The steganographic system was prototyped on National Instruments (NI) off-the-shelf USRPs B210 and X310 Software-defined Radios (SDRs). As a base for the implementation, the LTE-compliant srsLTE open-source software was leveraged, which offers protocol stack implementations for LTE base stations (eNBs), UEs, and core network. Note that the steganographic system can be easily extended to future cellular network implementations, e.g., 5G NR, beyond LTE.

Figure 13:
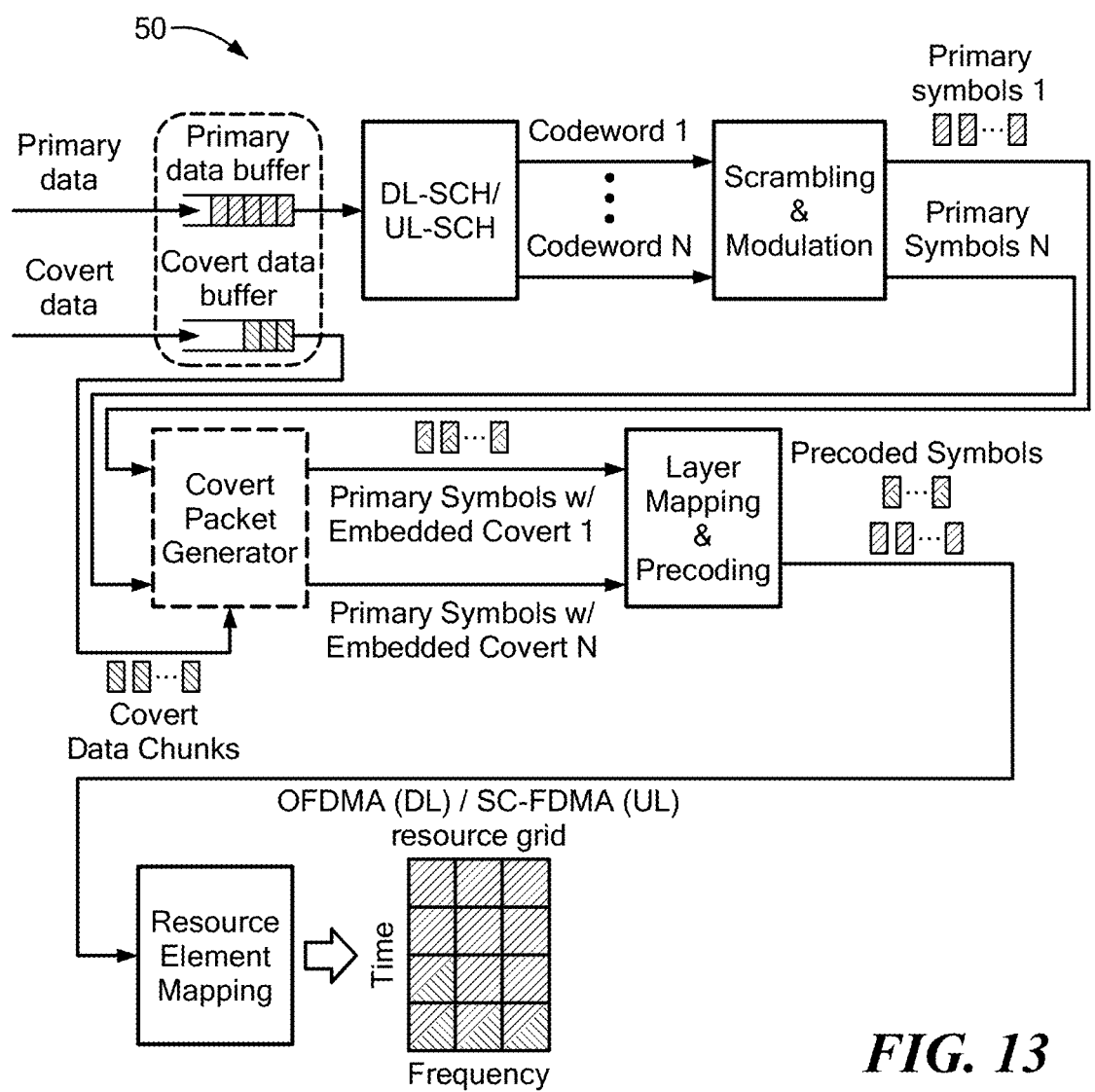
FIG. 13 is a schematic illustration of transmitter-side downlink (DL) PDSCH/uplink (UL) PUSCH.

The srsLTE functionalities were extended to allow the steganographic system to embed, encode, and decode covert data on the downlink and uplink LTE primary traffic. Specifically, the Physical Downlink Shared Channel (PDSCH) and Physical Uplink Shared Channel (PUSCH) PHY-layer LTE procedures were enhanced. The PDSCH is the physical channel that carries the downlink data the eNB sends to UEs, and the random access response messages in case the PDSCH is mapped to the Random Access Channel (RACH). The PUSCH, instead, carries the uplink data UEs transmit to the eNB, and ACKs and NACKs for the primary data UEs received through the PDSCH. FIG. 13 depicts the modified structure of a steganographic covert transmitter 50, i.e., the PDSCH at the eNB downlink side or the PUSCH at the UE uplink side.

When there is primary data to transmit (either to the UE if a downlink transmission, or to the eNB if an uplink one), this is converted into codewords through the Downlink Shared Channel (DL-SCH) (or the Uplink Shared Channel (UL-SCH)), which performs transport channel encoding operations. Then, the resulting codewords are scrambled and modulated into primary symbols (for illustration purposes, in the experiments a QPSK modulation was adopted for the primary LTE traffic that carries covert data). After these operations, the covert packet generator (see Section 2.2.1) modifies the amplitude of the resulting primary symbols, thus applying a second (covert) modulation to them. This way, the covert data chunks are embedded on the primary symbols (see FIG. 13). At this point, the complex-modulated primary symbols with embedded covert data are first mapped into one or multiple layers for spatial multiplexing purposes (according to the adopted transmission scheme and number of logical channels), and then precoded, as per standard LTE procedures. Finally, the resulting precoded symbols are mapped into resource elements to be transmitted via OFDMA, if a downlink transmission, or SC-FDMA, if an uplink one.

4. Experimental Evaluation

The experimental setup is described in Section 4.1. Then, the steganographic system is evaluated under: (i) Different primary traffic profiles (e.g., TCP, UDP, Internet Control Message Protocol (ICMP)) in Section 4.2; (ii) different distance and mobility patterns of the covert users in Section 4.3, and (iii) diverse undetectability schemes in Section 4.4. Then, the steganographic system can be used to enable PCCaaS, described in Section 4.5. The performance of the steganographic system on a concrete long-range scenario through the Platform for Open Wireless Data-driven Experimental Research (POWDER) 5G testbed, which is part of the Platforms for Advanced Wireless Research (PAWR) program, is demonstrated in Section 4.6.

4.1 Experimental Setup

Figure 14B:
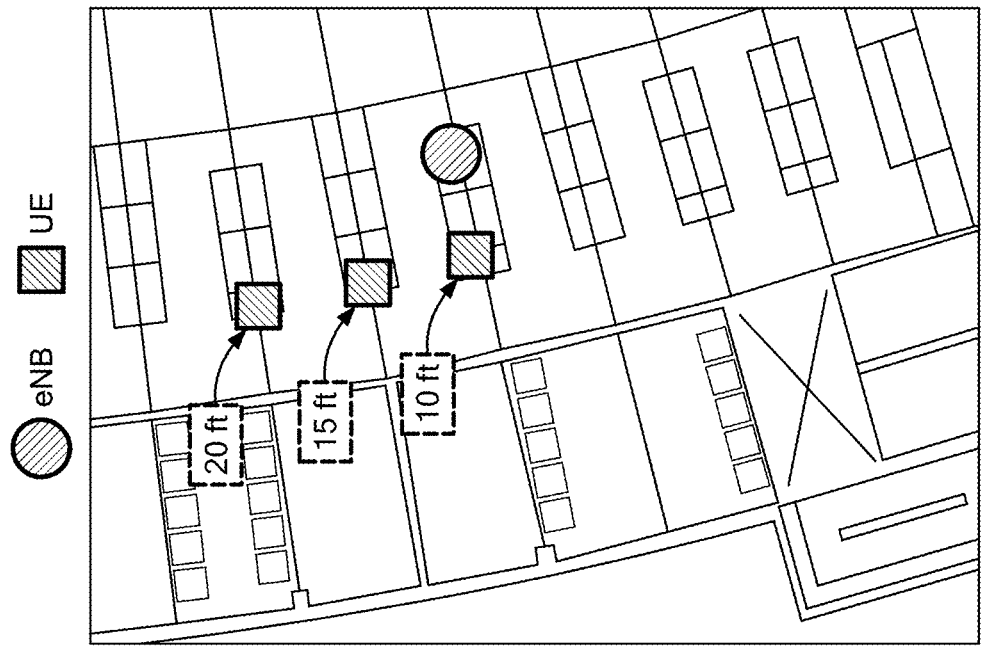
FIG. 14B is an illustration of a testbed setup and experiment configuration corresponding to FIG. 17.
Figure 14A:
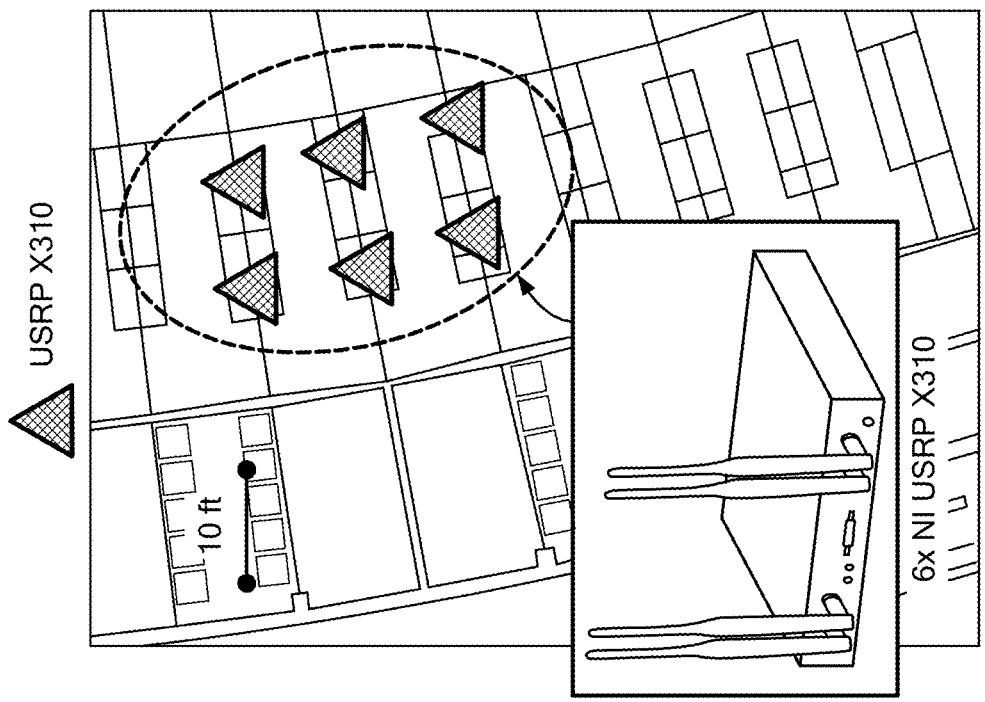
FIG. 14A is an illustration of a testbed setup and experiment configuration.
Figure 14C:
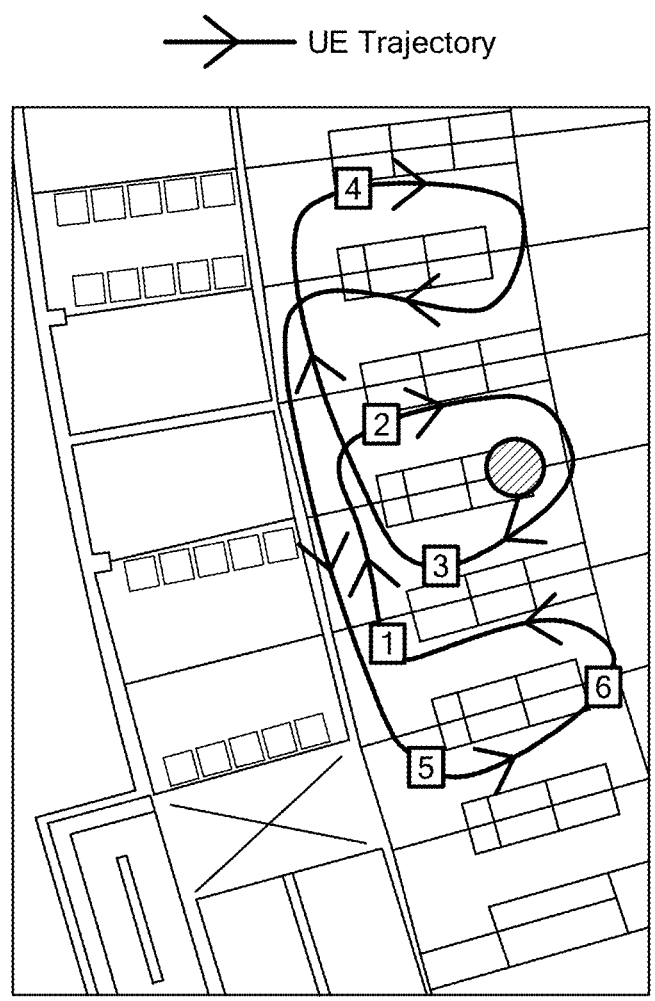
FIG. 14C is an illustration of a testbed setup and experiment configuration corresponding to FIG. 18.

The testbed configuration is illustrated in FIGS. 14A-14C. Six NI USRP X310 SDRs were used to instantiate LTE-compliant eNBs and UEs (see FIG. 14A). The USRPs X310 were placed in a rack and were controlled by Dell EMC PowerEdge R340 servers. These servers were connected to the SDRs through 10 Gbit/s optical fiber cables, which allowed low-latency control of the radios. The antennas of the SDRs were hung off the ceiling of a 2240 ft$^2$ indoor office space with rich multi-path and fading. Two different scenarios were considered: (i) A static scenario where the distance between covert transmitter and receiver varies in the range [10, 20] ft (see FIG. 14B), and (ii) a dynamic scenario in which the UE traveled a distance of 190 ft around the eNB (see FIG. 14C). Unless otherwise stated, the eNBs used a 10 MHz channel bandwidth corresponding to 50 Physical Resource Blocks (PRBs), and the distance between eNBs and UEs was set to 10 ft. For the mobility experiments of Section 4.3, a NI USRP B210 was used as covert UE, while Commercial Off-the-Shelf (COTS) Xiaomi Redmi Go smartphones were used as primary-only devices in the slicing experiments of Section 4.5.

4.2 Traffic Types

In this section, the throughput and retransmissions of the covert traffic for different types of primary traffic are reported. To achieve reproducibility of experiments and achieve fine-grained control of data generation, primary traffic was generated through the iperf3 tool. This software allows to measure network statistics, e.g., throughput and packet loss, and supports TCP and UDP protocols with different target bandwidths. Plots included 95% confidence intervals, which are not shown when below 1%.

Figure 15A:
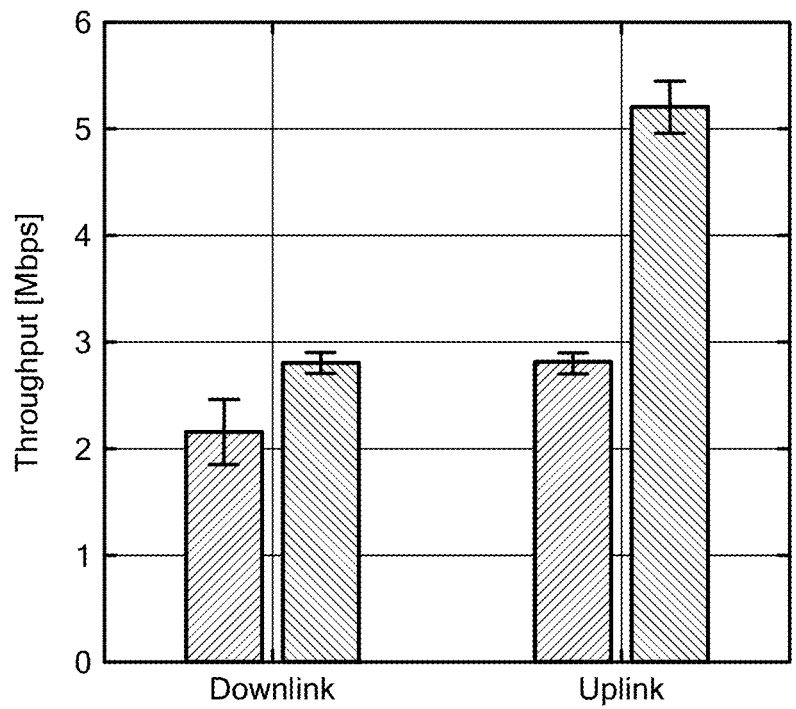
FIG. 15A is a graph of throughput for downlink and uplink covert performance with TCP primary traffic for different covert modulations.
Figure 15B:
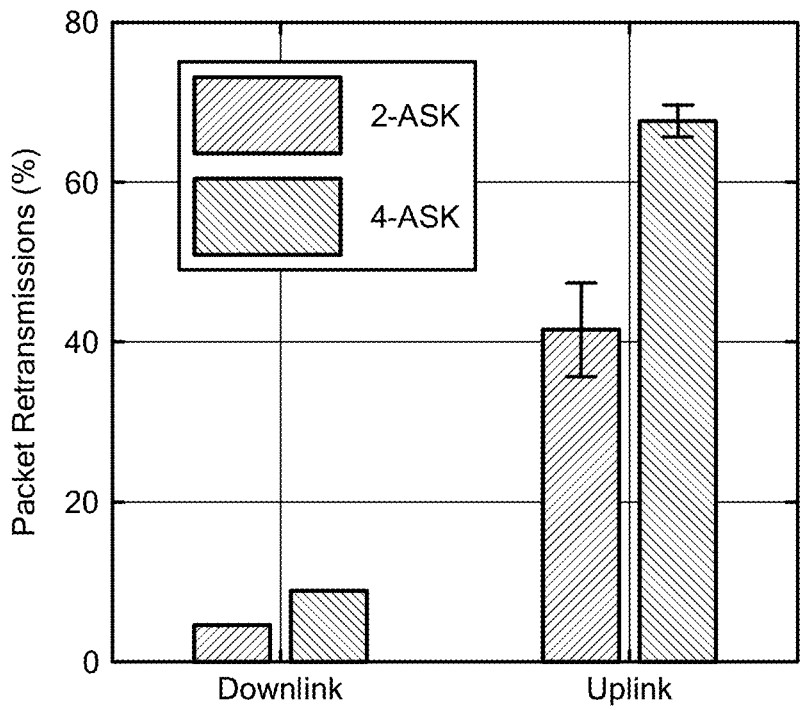
FIG. 15B is a graph of retransmissions for downlink and uplink covert performance with TCP primary traffic for different covert modulations.

FIGS. 15A-15B show the downlink and uplink covert throughput (FIG. 15A) and retransmissions (FIG. 15B) for both 2-ASK and 4-ASK covert modulations under TCP primary traffic. Being of higher order, 4-ASK obtained a higher throughput than 2-ASK (see FIG. 15A). However, this came at the cost of transmission errors leading to a higher percentage of covert packet retransmissions, as shown in FIG. 15B. Indeed, because of the higher resilience to errors of the 2-ASK modulation, as low as 40% packet retransmissions were required if compared with the 4-ASK case.

Figure 16A:
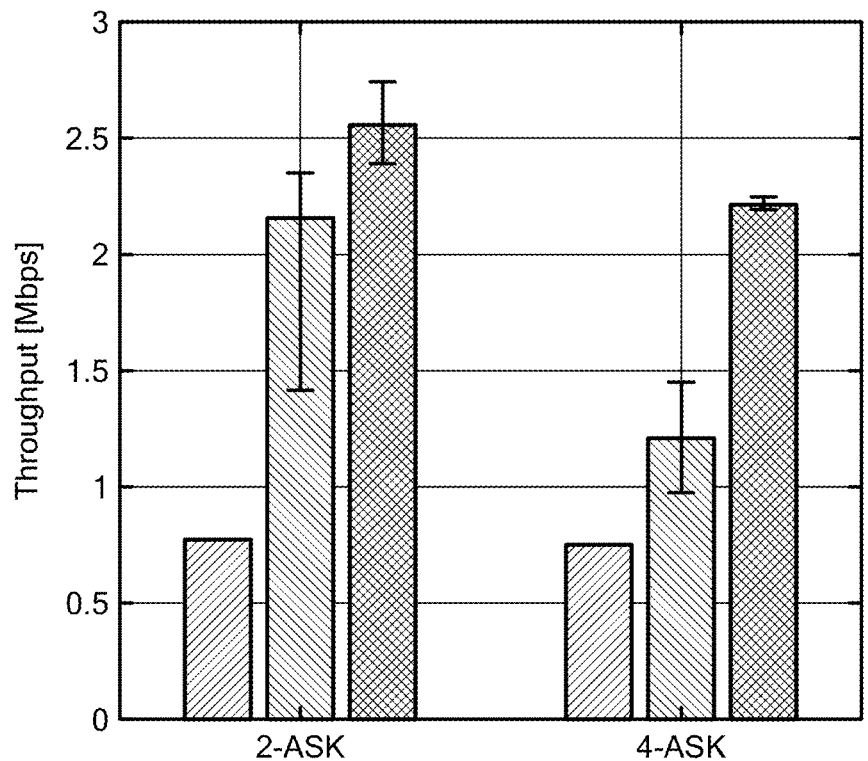
FIG. 16A is a graph of throughput for downlink covert performance with UDP primary traffic for different traffic profiles and covert modulations.
Figure 16B:
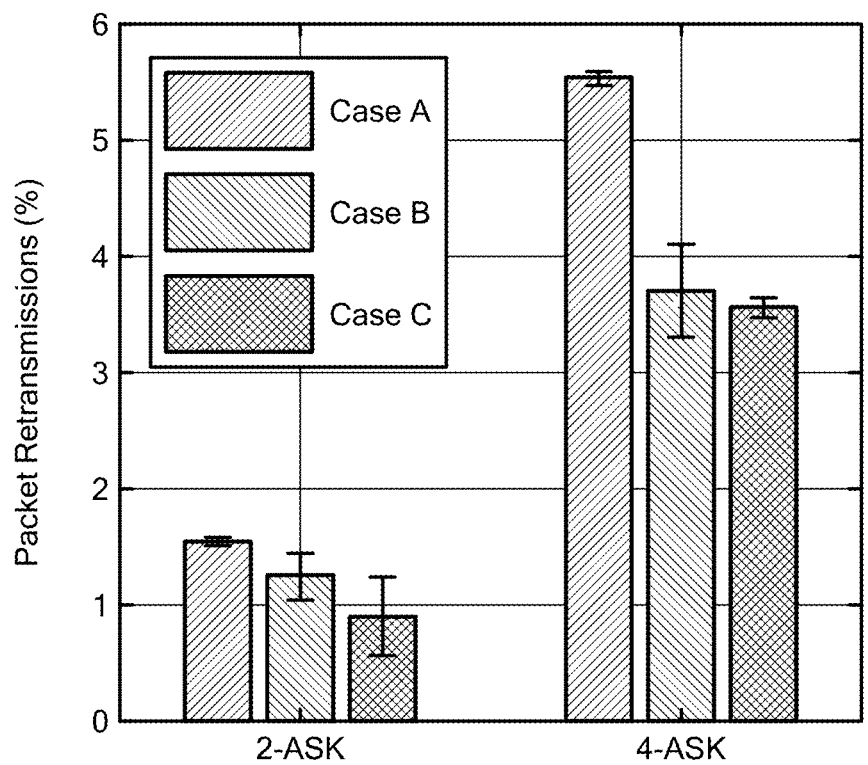
FIG. 16B is a graph of retransmissions for downlink covert performance with UDP primary traffic for different traffic profiles and covert modulations.

FIGS. 16A and 16B depict the covert throughput (FIG. 16A) and percentage of covert packet retransmissions (FIG. 16B) under UDP primary traffic. The iperf3 UDP target bandwidth parameter was set as follows: (i) 0.5 Mbps for Case A; (ii) 2 Mbps for Case B, and (iii) 5 Mbps for Case C. Conversely from TCP traffic (see downlink scenario in FIG. 15A), the throughput was higher when the covert data was embedded through a 2-ASK modulation. This is because, unlike TCP, UDP streamed data using the maximum specified target bandwidth disregarding acknowledgement timeouts and congestion control mechanisms. This behavior can be further observed from FIG. 16B, which shows a much higher (close to 3×) number of covert retransmissions in case the 4-ASK modulation is employed.

4.3 Distance and Mobility

In this section, the end-to-end covert traffic performance (see FIGS. 17A and 17B) is shown as a function of the different distances between eNB and UE shown in FIG. 14B, and then how the steganographic system allows the exchange of covert information in the presence of user mobility (see FIGS. 18A and 18B) for the UE trajectory depicted in FIG. 14C is demonstrated.

Figure 17A:
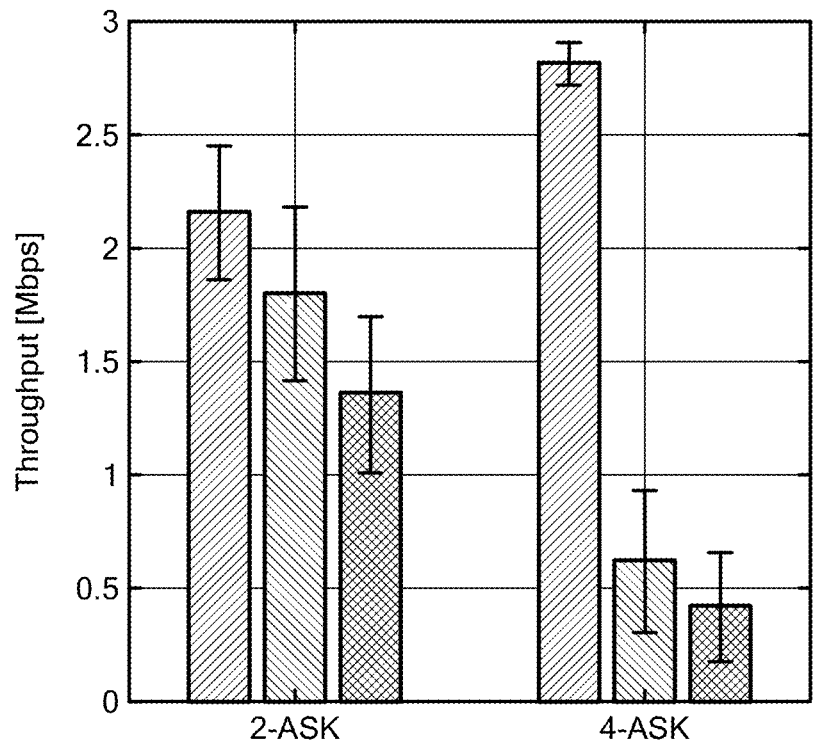
FIG. 17A is a graph of throughput for downlink covert performance with TCP primary traffic for different covert modulations and distances between eNB and UE (see FIG. 14B).
Figure 17B:
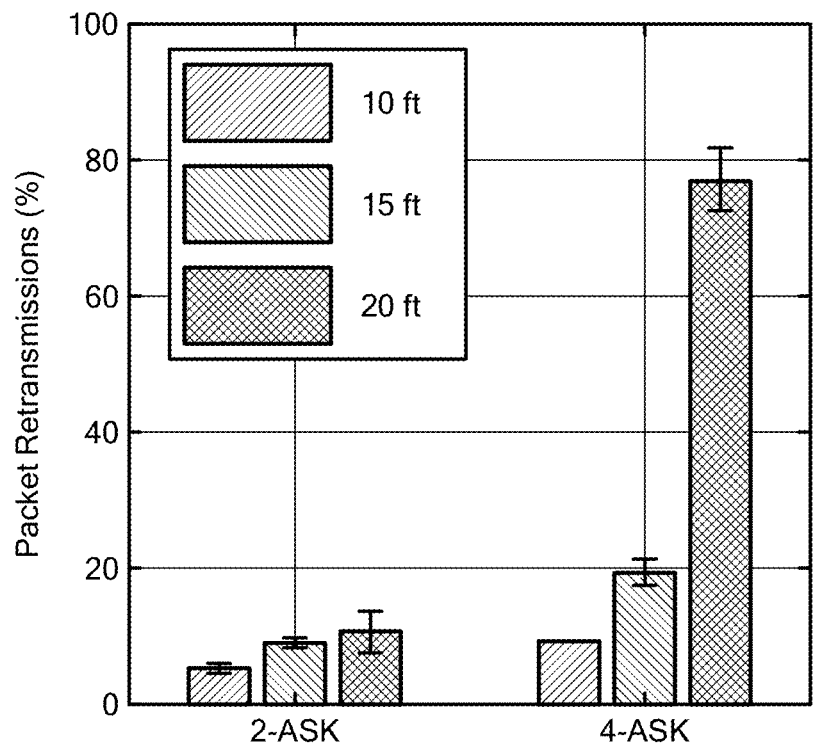
FIG. 17B is a graph of retransmission for downlink covert performance with TCP primary traffic for different covert modulations and distances between eNB and UE (see FIG. 14B).

FIGS. 17A and 17B respectively show the covert throughput and the percentage of packet retransmissions when TCP primary traffic is exchanged between eNB and UE, as a function of their relative distance (see FIG. 14B). It can be noticed that (i) for short distances (i.e., 10 ft) 4-ASK provided the highest performance; but (ii) as the distance between UE and eNB increases (i.e., 15 and 20 ft), modulating the covert message through 2-ASK yielded a better performance, both in terms of throughput (see FIG. 17A) and packet retransmissions (see FIG. 17B). This was because of the higher robustness to errors of this modulation compared to the 4-ASK modulation.

Figure 18A:
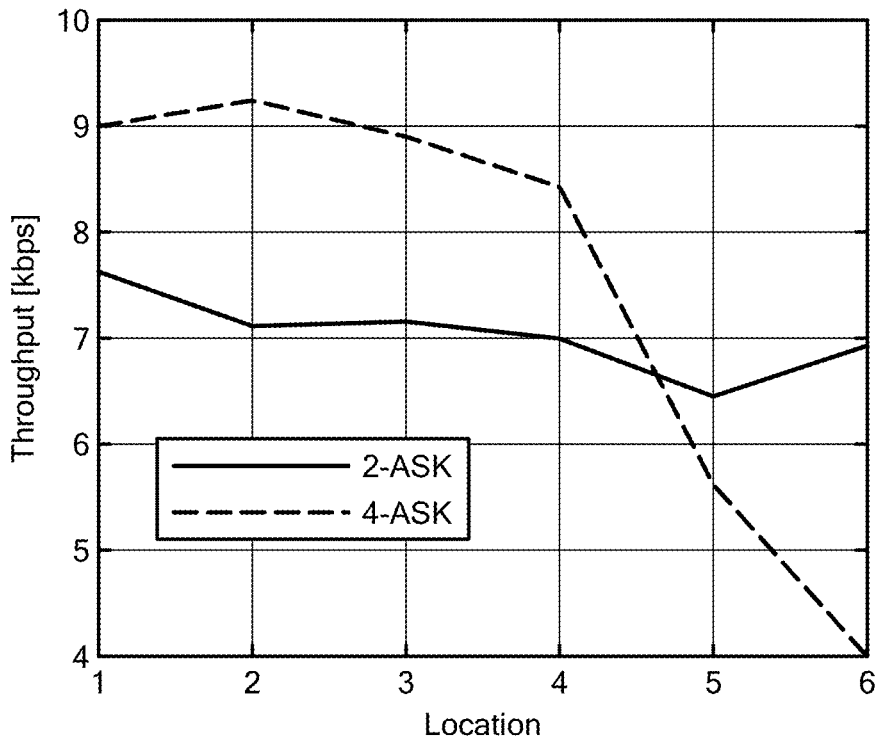
FIG. 18A is a graph of throughput for covert performance with ICMP echo reply primary traffic for different covert modulations in presence of UE mobility (see locations of FIG. 14C).
Figure 18B:
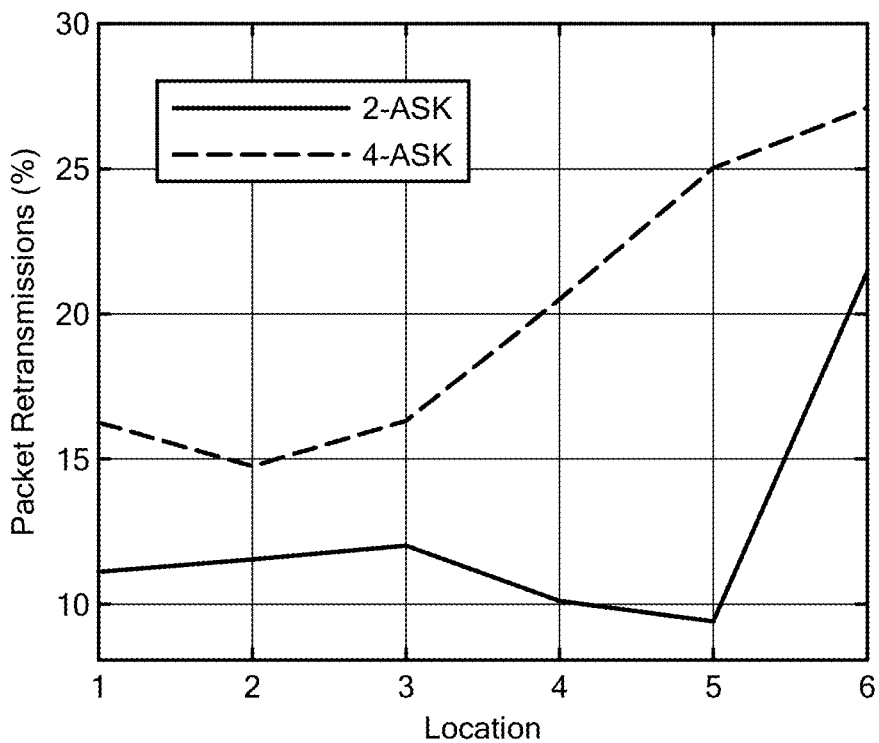
FIG. 18B is a graph of retransmission for covert performance with ICMP echo reply primary traffic for different covert modulations in presence of UE mobility (see locations of FIG. 14C).

Next, it was shown how the steganographic system was still able to send covert information in the presence of user mobility. In this experiment, primary traffic was generated through the ping software utility, which generated low-rate primary traffic leveraging ICMP echo request and reply messages. The performance of the steganographic system for the different user locations of FIG. 14C and for different covert modulations is shown in FIGS. 18A and 18B. As the distance between eNB and UE increased, the covert throughput (FIG. 18A) for both 2-ASK and 4-ASK modulations decreased, while the percentage of packet retransmissions increased (FIG. 18B). Despite the performance degradation, the steganographic system still managed to enable secret communications between covert transmitter and receiver in presence of user mobility.

4.4 Undetectable Covert Transmissions

Figure 19A:
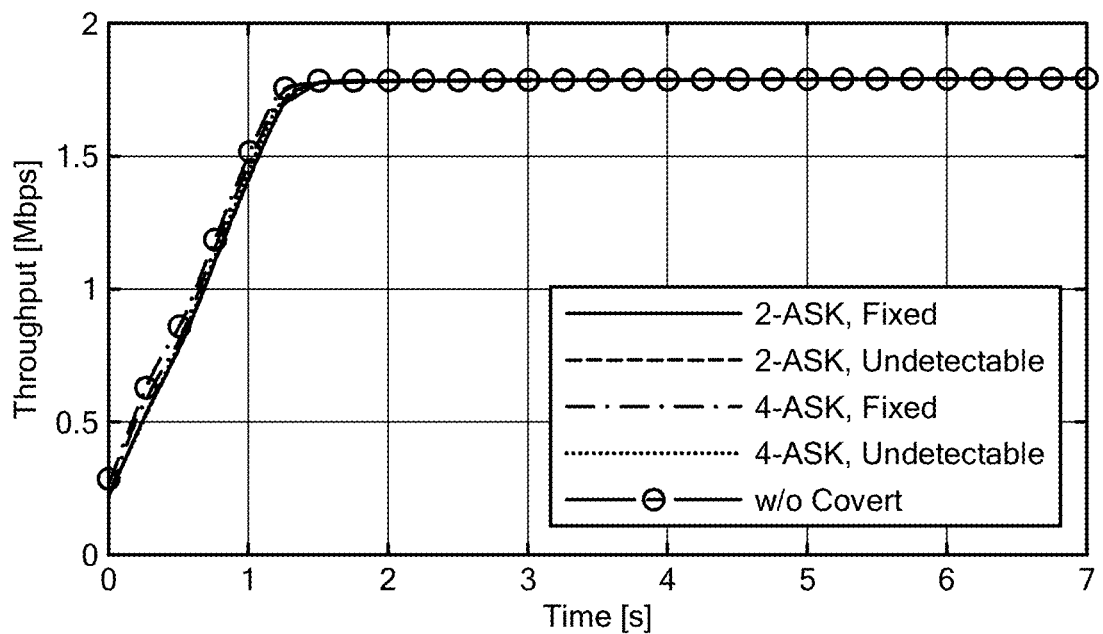
FIG. 19A is a graph of throughput vs. time on primary with SpeedTest traffic.
Figure 19B:
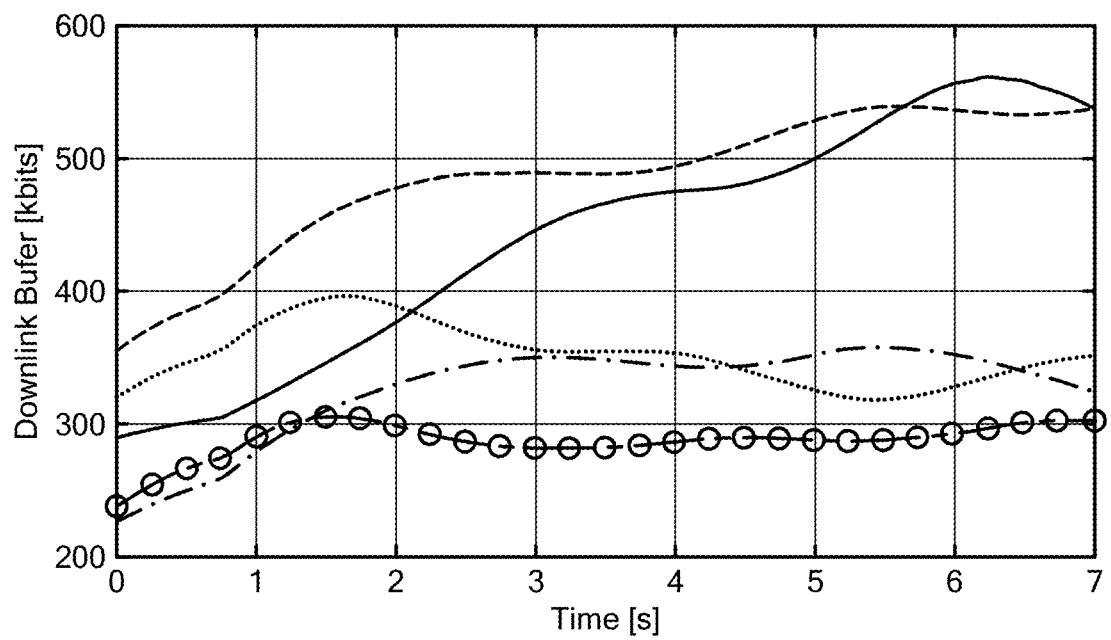
FIG. 19B is a graph of downlink buffer vs. time on primary with SpeedTest traffic.
Figure 19C:
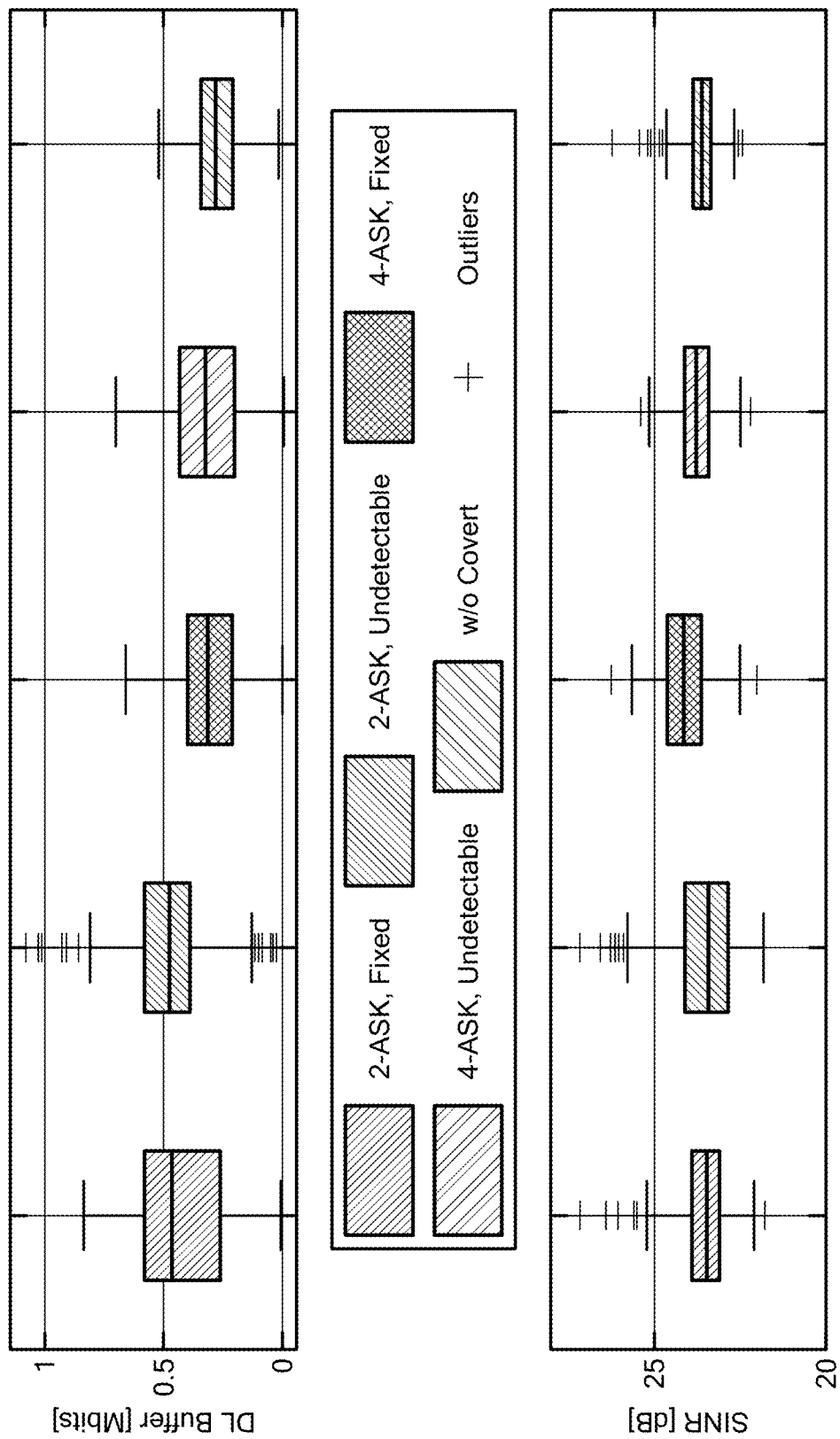
FIG. 19C illustrates graphs of downlink buffer (top) and SINR (bottom) for different covert modulations, from left to right: 2-ASK, Fixed; 2-ASK, Undetectable; 4-ASK, Fixed; 4-ASK, Undetectable; Without cover. (Outliers indicated with a + sign.)

The impact of the undetectability schemes discussed in Section 2.4 on the performance of primary transmissions was investigated. FIGS. 19A and 19B show respectively the time-series of downlink primary throughput and transmission buffer averaged over 10 independent experiment runs. FIG. 19C shows the distribution of the downlink buffer at the eNB and the Signal-to-Interference-plus-Noise Ratio (SINR) measured at the user-side. On the one hand, FIG. 19A indicates that embedding covert messages—both fixed and undetectable—did not noticeably affect primary traffic. On the other hand, in FIG. 19B, a slight increase of the downlink buffer queues at the eNB-side can be noticed when covert communications happened. This suggests that a higher number of retransmissions was needed for the eNB to deliver the primary traffic to the UEs. However, FIG. 19A points out that the impact of this buffer increase on the primary throughput was negligible.

FIG. 19C shows the distribution of both downlink buffer and SINR of the primary traffic with covert traffic (fixed and undetectable) and without. FIG. 19C concludes that the covert distributions did not vary significantly from the distribution of the primary-only traffic, i.e., without covert message embedded (106.5 kbit, and 0.15 dB difference on average).

4.5 Steganographic System for PCCaaS

With the above results at hand, it can be seen how the steganographic system can be used to instantiate private network slices on a shared cellular infrastructure while allowing co-existence of both primary-only and covert transmissions. This capability is particularly useful for PCCaaS applications where law enforcement agents need to rapidly instantiate a private and secure cellular network. In this set of experiments, two slices were instantiated: a primary-only slice (i.e., Slice 1) serving covert-agnostic UEs, and a PCCaaS private slice (i.e., Slice 2) carrying both primary and covert traffic. UE 1 and UE 2 belonged to Slice 1, where they were provided with standard cellular service, while UE 3 belonged to Slice 2, which was the steganographic private slice. Moreover, two different network slicing policies were considered: (i) Allocation A, where spectrum resources were evenly split among the two slices, and (ii) Allocation B, where 70% of the resources were allocated to Slice 1 (primary-only) and 30% to Slice 2 (private).

Figure 20:
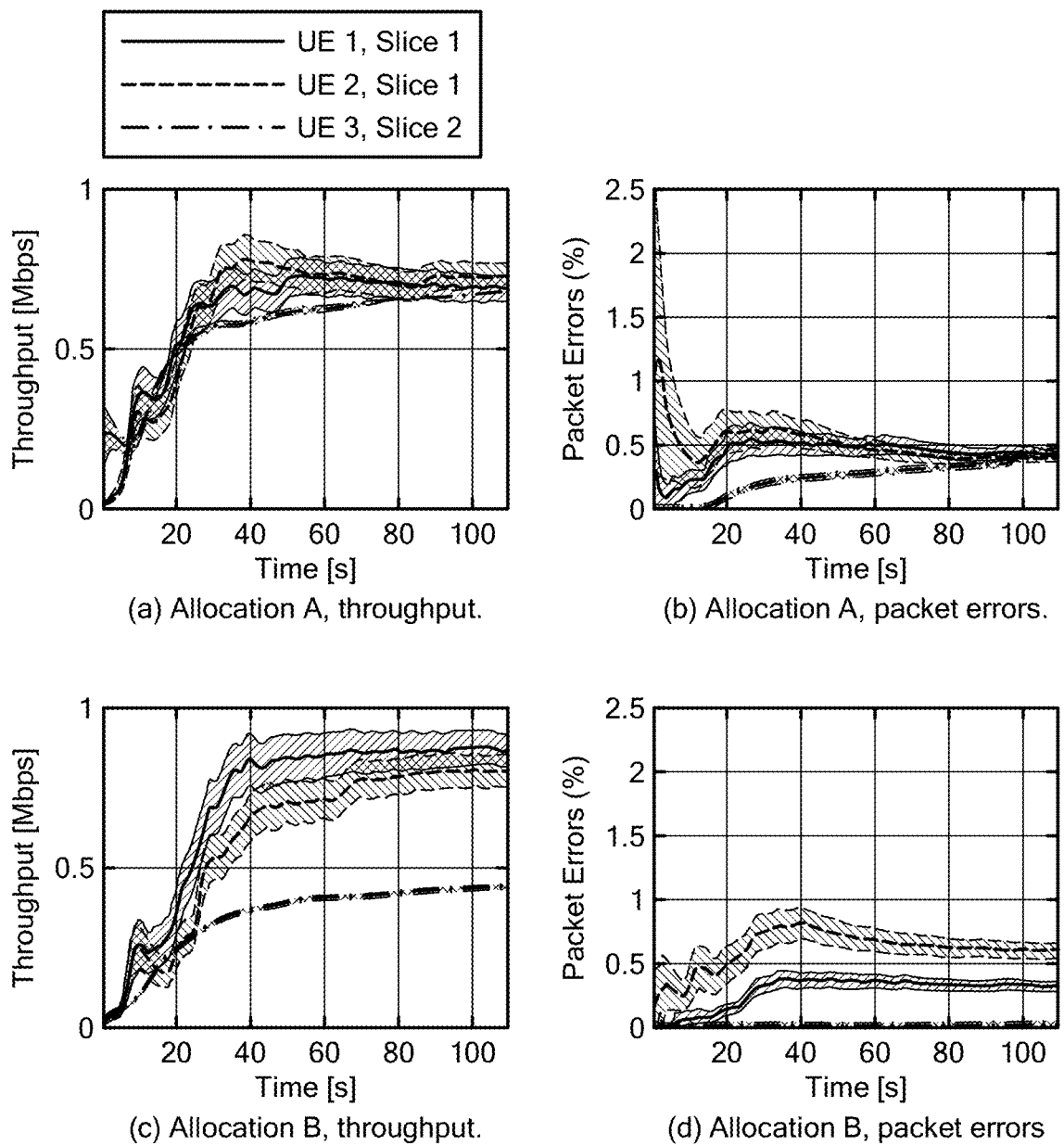
FIG. 20 illustrates graphs of throughput and percentage of packet errors on primary traffic for different resource allocations of the private and standard slices: (a) Allocation A, throughput; (b) Allocation A, packet errors; (c) Allocation B, throughput; (d) Allocation B, packet errors.

FIG. 20 shows the throughput and percentage of packet errors for the different slicing configurations when all users generated video streaming traffic from YouTube.

Commercial off-the-shelf Xiaomi Redmi Go smartphones were used as the standard (non-covert) devices (i.e., UE 1 and UE 2). Both eNB and covert user (i.e., UE 3), instead, were implemented through USRPs X310. Covert data of UE 3 was embedded through a 4-ASK modulation. It can be noticed that in both allocations, the primary throughput of all users was not impacted by the presence of covert communications. Indeed, the percentage of packet errors (see FIGS. 20(b) and 20(d)) was negligible in both allocation cases (i.e., below 0.5% on average, with a peak of 2.5%). As a result, FIGS. 20(a) and 20(c) show that the throughput levels achieved by all users was enough for video streaming applications, thus demonstrating the low impact of the steganographic system on primary performance.

4.6 Long-Range Evaluation

The steganographic system was demonstrated on the PAWR POWDER 5G wireless platform. Specifically, the NR version of srsLTE was leveraged to instantiate a 5G base station (gNB) and UE, both located outdoors. The gNB was located on the rooftop of a 95 ft-tall building and used a USRP X310 to send covert information to a ground-level UE, implemented through a USRP B210. The distance between gNB and UE was 852 ft (see FIG. 21C). For this experiment, gNB and UE exchanged ICMP echo request/reply messages generated through the ping command, and the gNB used a channel bandwidth of 3 MHz. Covert data was embedded through a 2-ASK modulation.

Figure 21A:
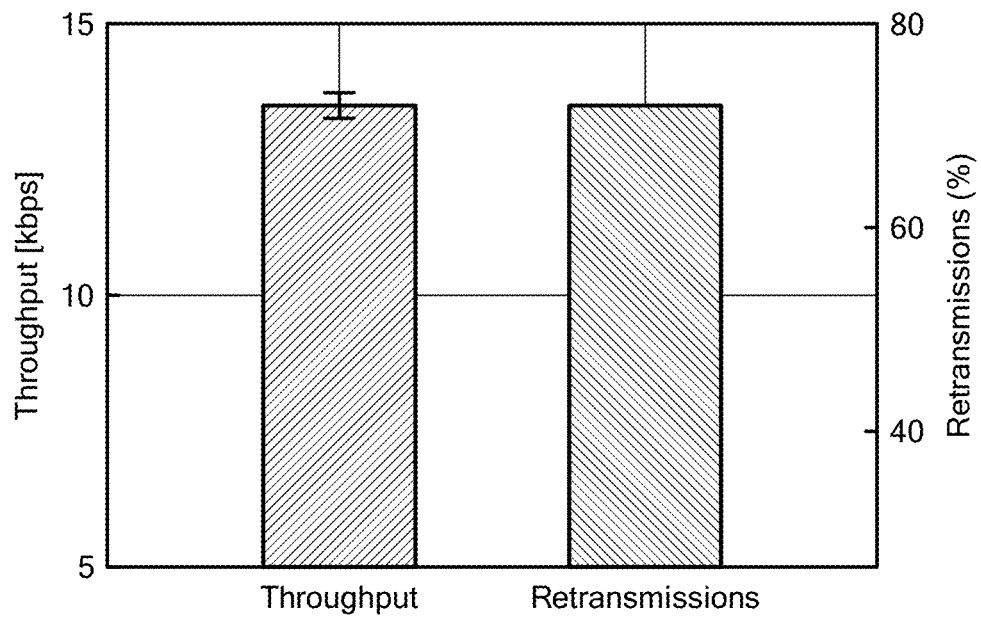
FIG. 21A is a graph of throughput and retransmissions of covert messages in long-range experiments with ICMP echo request primary traffic on the POWDER platform.
Figure 21B:
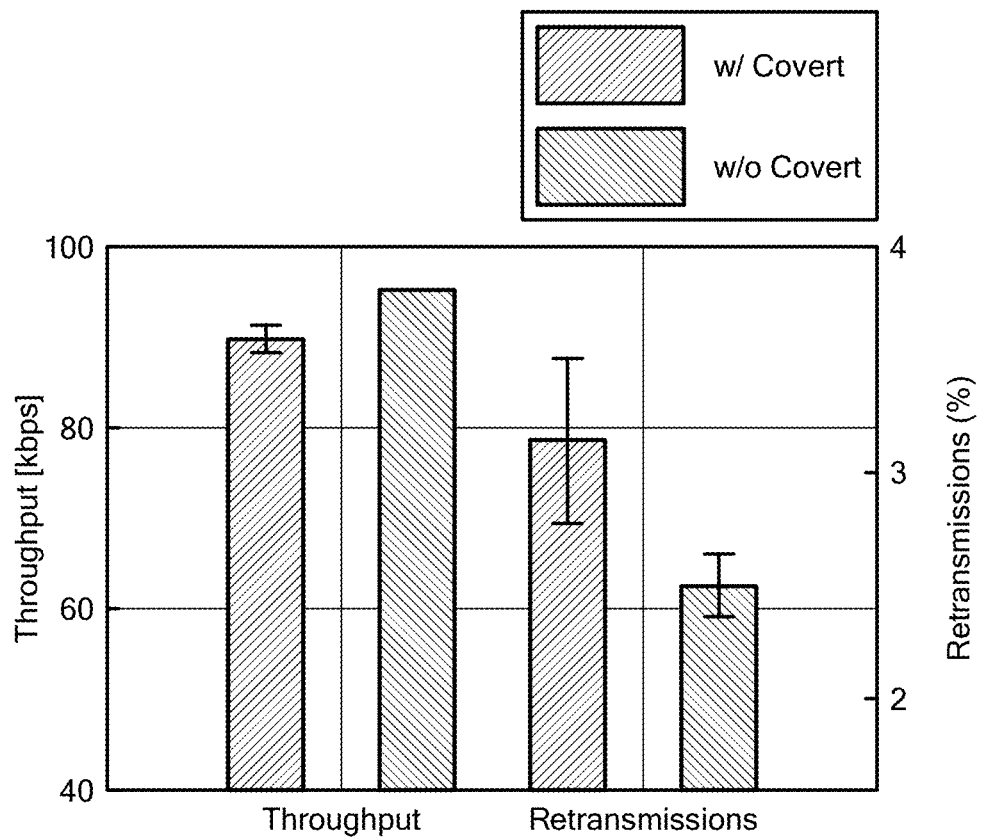
FIG. 21B is a graph of throughput and retransmissions of primary traffic in long-range experiments with ICMP echo request primary traffic on the POWDER platform.
Figure 21C:
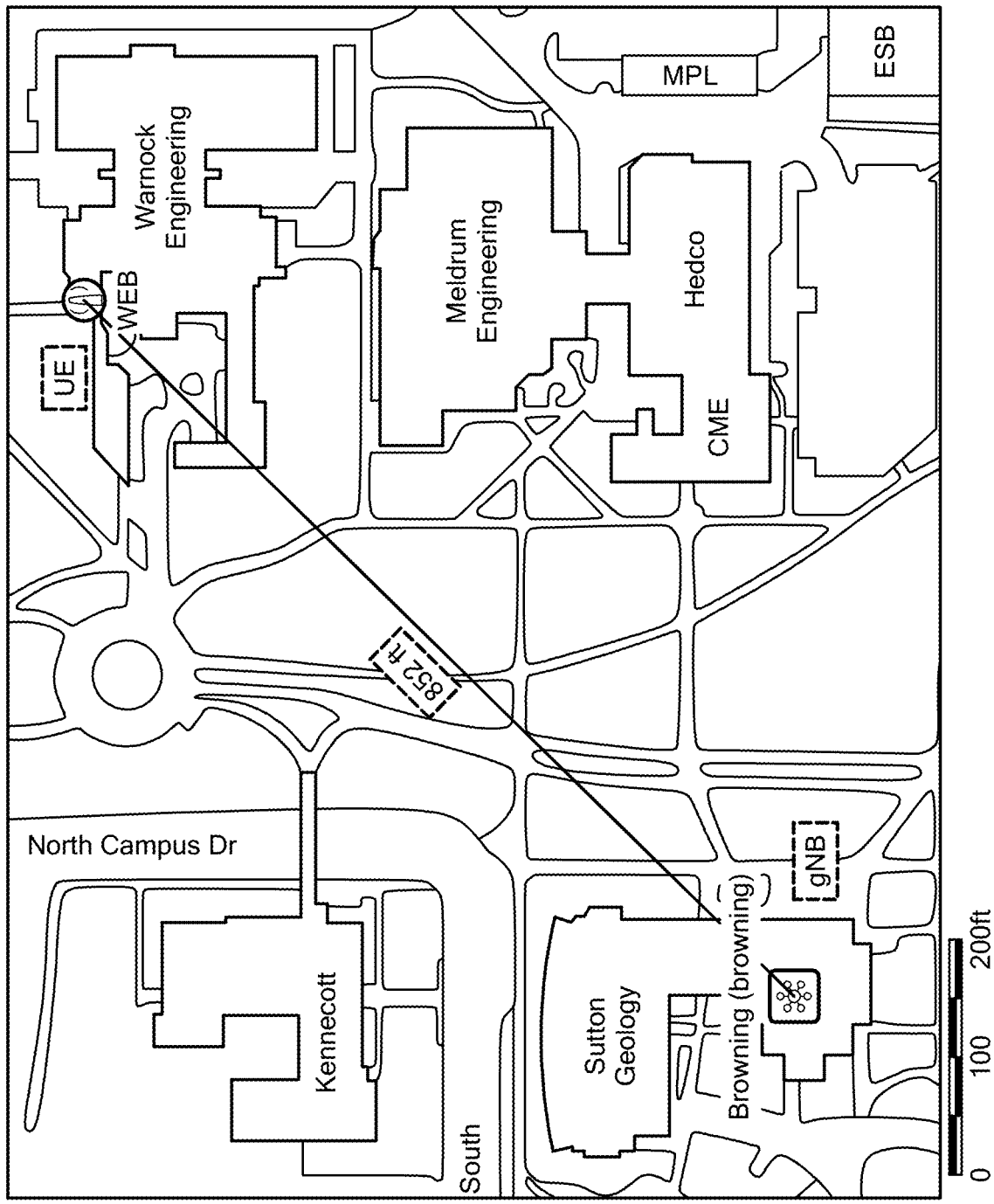
FIG. 21C is an illustration of the POWDER long-range setup used in the experiments of FIGS. 21A and 21B.

FIG. 21A shows covert throughput and retransmission percentage when the gNB sent a covert message to the UE, while FIG. 21B depicts the above metrics relative to the primary traffic, both with and without embedded covert message. FIG. 21B indicates the negligible effect of embedding covert packets onto primary traffic. Indeed, the primary throughput degradation over this long-range scenario was merely 5.59%, whereas the packet retransmission percentage increased from 2.6% to 3.2% (0.6% increase) when covert traffic was embedded. Finally, FIG. 21A shows that SteaLTE was still capable of delivering covert messages despite the severe path-loss conditions due to long distance, thus demonstrating the suitability of the steganographic system for long-range cellular applications.

Accordingly, the technology described and evaluated herein can provide a PCCaaS-enabling system for cellular networks. Through a full-stack wireless steganography implementation, SteaLTE can support reliable, undetectable, high-throughput, and long-range covert communications. Its effectiveness has been demonstrated by a prototype on an LTE-compliant testbed and its performance evaluated under diverse traffic profiles, distance and mobility patterns, as well as different tradeoffs between throughput and undetectability. The performance of the steganographic system has been demonstrated on a concrete long-range scenario through the PAWR POWDER platform. Results have shown that the steganographic system delivered 90% throughput of the primary traffic in 79% of the experiments, with up to 6% loss in the primary traffic's throughput.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A device for steganographic communication comprising:
   a transmitter including one or more processors and memory, instructions stored in the memory, the transmitter comprising a covert packet generator operative to receive a covert data stream of covert data and a primary data stream of primary in-phase and quadrature (I/Q) symbols, and to embed the covert data as covert data symbols within the primary I/Q symbols in a covert packet, wherein the covert packet has a data structure comprising a header, a payload, and a payload error detecting code; and
   a radio frequency (RF) front end and antenna operative to transmit and receive radio frequency signals, the RF front end in communication with the covert packet generator to receive the covert packet for transmission, wherein the covert packet generator is operative to determine if a number of the primary I/Q symbols is large enough to generate the header of the covert packet.

2. The device of claim 1, wherein the header includes:
   a payload length field containing a total length of the covert payload and the payload error detecting code;
   an information field containing information on how to demodulate the covert packet by a receiver; and
   a header error detecting code field.

3. The device of claim 2, wherein the information field contains:
   a packet number comprising a sequential number to identify the covert packet;

covert modulation parameters indicative of a modulation scheme, the cover modulation parameters including a modulation order, coding map associating covert bit sequences to modulated covert symbols, and a packet type; and a threshold flag indicative of a distance between the covert data symbols on a constellation diagram.

4. The device of claim 2, wherein the information field contains an identification of a packet type, wherein the packet type is one or more of an acknowledgement (ACK) message type, a negative-acknowledgement (NACK) message type, a covert data-carrying type, a packet information-carrying type, a challenge message type, a challenge response message type, and an authentication acknowledgement message type.

5. The device of claim 4, wherein the packet information-carrying type includes information on source and destination of covert packets and a total number of covert packets in a transmission.

6. The device of claim 1, wherein the covert packet generator is operative to generate displacements in the primary I/Q symbols in a constellation diagram based on the covert data symbols.

7. The device of claim 6, wherein the covert packet generator is operative to generate the displacements randomly among a plurality of transmitted covert packets in a transmission stream and to include a threshold flag in the header of the covert packet comprising a value indicative of the displacement in the I/Q symbols, wherein the value is changed on a per-packet basis.

8. The device of claim 1, wherein the transmitter is further operative to:
transmit a queue of covert packets to a receiver, located remotely from the transmitter, and to wait a determined time for an acknowledgement message or a negative-acknowledgement message from the receiver;
retransmit the queue of covert packets to the receiver upon receipt of a negative-acknowledgement message;
retransmit the queue of covert packets to the receiver upon expiration of the determined time if no acknowledgement message or negative-acknowledgement message has been received at the transmitter; or
stop attempted transmissions of the queue of covert packets after a number of retransmission attempts exceeds a determined threshold.

9. A system for steganographic communication comprising:
the device of claim 1; and
a receiver located remotely from the transmitter, the receiver including one or more processors and memory, instructions stored in the memory, the receiver comprising:
a covert packet detector operative to receive incoming transmissions from the transmitter, to detect a presence of the covert packet, and to extract covert information from the covert packet; and
a covert demodulator operative to demodulate the covert symbols.

10. The system of claim 9, wherein the transmitter and the receiver are operative to send covert authentication messages for mutual authentication, the covert authentication messages including a type indicator including a challenge type, a challenge response, and an authentication acknowledgement type.

11. The system of claim 10, wherein:
the transmitter is operative to authenticate the receiver by:
sending a covert authentication message to the receiver including an authentication code,
receiving a reply covert message from the receiver including an authentication code result,
determining if the authentication code result from the receiver matches an expected authentication code result, and
if the authentication code result matches the expected authentication code result, sending a covert authentication acknowledgement message to the receiver; and
the receiver is operative to authenticate the transmitter by:
sending a further covert authentication message to the transmitter including a further authentication code,
receiving a further reply covert message from the transmitter including a further authentication code result,
determining if the further authentication code result from the transmitter matches a further expected authentication code result, and
if the further authentication code result matches the further expected authentication code result, sending a further covert authentication acknowledgement message to the transmitter.

12. A method of steganographic communication, comprising:
at a transmitter, generating a covert packet containing covert data embedded as covert symbols within primary in-phase and quadrature (I/Q) symbols, the covert packet having a data structure comprising a header, a payload, and a payload error detecting code;
determining if a number of the primary I/Q symbols is large enough to generate the header of the covert packet; and
transmitting the covert packet as a radio frequency (RF) transmission to a receiver located remotely from the transmitter.

13. The method of claim 12, further comprising generating the header to include:
a payload length field containing a total length of the covert payload and the payload error detecting code;
an information field containing information on how to demodulate the covert packet by a receiver, wherein the information field contains:
a packet number comprising a sequential number to identify the covert packet,
covert modulation parameters, the cover modulation parameters including a modulation order, coding map associating covert bit sequences to modulated covert symbols, and a packet type, and
a threshold flag indicative of a distance between the covert data symbols on a constellation diagram; and
a header error detecting code field.

14. The method of claim 12, further comprising generating displacements in the primary I/Q symbols in a constellation diagram based on the covert data symbols.

15. The method of claim 14, further comprising:
generating the displacements randomly among a plurality of transmitted covert packets in a transmission stream;
generating a threshold flag in the header of the covert packet comprising a value indicative of the displacement in the I/Q symbols; and
changing the value on a per-packet basis.

16. The method of claim 12, further comprising:
transmitting the acknowledgement message and the negative-acknowledgement message as covert packets by the receiver;

retransmitting the queue of covert packets to the receiver upon receipt of a negative-acknowledgement message;

retransmitting the queue of covert packets to the receiver upon expiration of the determined time if no acknowledgement message or negative-acknowledgement message has been received at the transmitter; or stopping attempted transmissions of the queue of covert packets after a number of retransmission attempts exceeds a determined threshold.

17. The method of claim 16, further comprising, at the transmitter and/or the receiver, sending covert authentication messages for mutual authentication, the covert authentication messages including a type indicator including a challenge type, a challenge response type, and an authentication acknowledgement type.

18. The method of claim 12, further comprising, at the receiver located remotely from a transmitter:

receiving incoming transmissions from the transmitter;

detecting a presence of the covert packet by reading a length of a covert payload and a payload error code, a packet number, and modulation parameters in the header;

extracting covert information from the covert packet; and demodulating the covert symbols.

* * * * *